US009626737B2

(12) United States Patent
Frushour et al.

(10) Patent No.: US 9,626,737 B2
(45) Date of Patent: Apr. 18, 2017

(54) DEVICES, SYSTEMS, AND METHODS FOR EXAMINING THE INTERACTIONS OF OBJECTS IN AN ENHANCED SCENE

(71) Applicants: Canon Information and Imaging Solutions, Inc., Melville, NY (US); Canon U.S.A., Inc., Melville, NY (US)

(72) Inventors: Nicholas John Frushour, Tustin, CA (US); Tokio Otsuka, Great Neck, NY (US); Hideo Mizoguchi, Syosset, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 152 days.

(21) Appl. No.: 14/540,906

(22) Filed: Nov. 13, 2014

(65) Prior Publication Data
US 2015/0138233 A1 May 21, 2015

Related U.S. Application Data

(60) Provisional application No. 61/904,937, filed on Nov. 15, 2013.

(51) Int. Cl.
G06T 19/00 (2011.01)
G06T 3/00 (2006.01)

(52) U.S. Cl.
CPC .............. G06T 3/00 (2013.01); G06T 19/006 (2013.01)

(58) Field of Classification Search
None
See application file for complete search history.

(56) References Cited

U.S. PATENT DOCUMENTS 6,699,127 B1   3/2004  Lobb
7,632,186 B2  12/2009  Spanton
(Continued)

FOREIGN PATENT DOCUMENTS

CN   102254346   11/2011
CN   102654888    9/2012
(Continued)

OTHER PUBLICATIONS

David E. Breen et al., Interactive Occlusion and Collision of Real and Virtual Objects in Augmented Reality, European Computer-Industry Research Centre, 1995.
(Continued)

Primary Examiner — Ryan D McCulley
(74) Attorney, Agent, or Firm — Canon U.S.A., Inc. IP Division

(57) ABSTRACT

Systems, devices, and methods obtain a sequence of images of a physical scene that includes a physical representation of a first object; calculate a sequence of first transform values of the physical representation of the first object based on the sequence of images store the sequence of first transform values; generate an enhanced scene; maintain the first object in the enhanced scene at positions and orientations that are indicated by the sequence of first transform values; receive an indication of selected transform values in the sequence of first transform values; retrieve the selected transform values; and generate a replay image of the enhanced scene, from a second observer viewpoint, that shows the first object at the position and the orientation that are indicated by the selected transform values.

16 Claims, 18 Drawing Sheets

(56) References Cited

U.S. PATENT DOCUMENTS

| | | |
|---|---|---|
| 8,072,470 B2 | 12/2011 | Marks |
| 8,243,099 B2 | 8/2012 | Ryu |
| 8,681,179 B2 | 3/2014 | Rolleston |
| 2002/0084974 A1* | 7/2002 | Ohshima ............... A63F 13/00 345/156 |
| 2005/0264555 A1* | 12/2005 | Zhou ................. G06F 3/0346 345/419 |
| 2007/0279494 A1* | 12/2007 | Aman ................. G01S 3/7864 348/169 |
| 2010/0103075 A1* | 4/2010 | Kalaboukis ............. A63F 13/02 345/8 |
| 2010/0271367 A1* | 10/2010 | Vaden ................... A63F 13/10 345/420 |
| 2010/0289817 A1 | 11/2010 | Meier |
| 2013/0095924 A1* | 4/2013 | Geisner ................ A63F 13/00 463/32 |
| 2013/0128022 A1* | 5/2013 | Bose ........................ H04N 7/18 348/77 |
| 2013/0155106 A1 | 6/2013 | Rolleston |
| 2013/0207896 A1* | 8/2013 | Robinson ............... G06F 3/013 345/158 |
| 2013/0286004 A1* | 10/2013 | McCulloch ........... G06T 19/006 345/419 |
| 2013/0314442 A1* | 11/2013 | Langlotz .............. G06T 19/006 345/633 |
| 2013/0342570 A1 | 12/2013 | Kinnebrew |
| 2014/0002444 A1 | 1/2014 | Bennett |
| 2014/0038708 A1 | 2/2014 | Davison |
| 2014/0071165 A1* | 3/2014 | Tuchschmid .......... G09B 23/30 345/633 |
| 2014/0094313 A1 | 4/2014 | Watson |
| 2015/0356788 A1* | 12/2015 | Abe ..................... G06T 19/006 345/633 |

FOREIGN PATENT DOCUMENTS

| | | |
|---|---|---|
| CN | 103034550 | 4/2013 |
| DE | 10230911 | 2/2004 |
| ES | 2318989 | 2/2010 |
| GB | 2494697 | 3/2013 |

OTHER PUBLICATIONS

Yan Li et al., A real-time collision detection between virtual and real objects based on three-dimensional tracking of hand, 2010 International Conference on Audio Language and Image Processing (ICALIP), 2010.

Michel Kruiskamp, Interaction, Collision Detection and other Aspects of Mixed Reality, University of Twente, 2005.

Wikia.com, Theater Mode, downloaded from http://callofduty.wikia.com/wiki/Theater_Mode on Jul. 18, 2014.

Jean Sreng et al., Using Visual Cues of Contact to Improve Interactive Manipulation of Virtual Objects in Industrial Assembly/Maintenance Simulations, IEEE Transactions on Visualization and Computer Graphics, vol. 12, No. 5, Sep./Oct. 2006.

David E. Breen et al., Interactive Occlusion and Automatic Object Placement for Augmented Reality, 1996.

Mixed & Augmented Reality Furniture, Mar. 2013.

Nicolas Imbert et al., Adding Physical Properties to 3D Models in Augmented Reality for Realistic Interactions Experiments, 2013 International Conference on Virtual and Augmented Reality in Education, 2013.

Benjamin Lok et al., Incorporating Dynamic Real Objects into Immersive Virtual Environments, 2003.

Simon Prince et al., 3D Live: Real Time Captured Content for Mixed Reality, Proceedings of the International Symposium on Mixed and Augmented Reality, 2002.

Lisa Tolentino et al., Teaching and Learning in the Mixed-Reality Science Classroom, J Sci Educ Technol, 2009.

* cited by examiner

Viewpoint 4

Viewpoint 5

Viewpoint 6

DEVICES, SYSTEMS, AND METHODS FOR EXAMINING THE INTERACTIONS OF OBJECTS IN AN ENHANCED SCENE

CROSS-REFERENCE TO RELATED APPLICATIONS

This application claims priority to U.S. Provisional Application No. 61/904,937, which was filed on Nov. 15, 2013.

BACKGROUND

Technical Field

This description generally relates to mixed-reality environments.

Background

Design processes are adopting computer-generated and three-dimensional-display technologies because these technologies often lower costs and improve efficiency. For example, a computer-generated three-dimensional model of a building allows architects and customers to "walk-through" and inspect the design of the building before the physical construction of the building has started. Also for example, a computer-generated three-dimensional model of a room and the room's furnishings allows a user to inspect the layout of the furnishings.

SUMMARY

In one embodiment, a method comprises obtaining a sequence of images of a physical scene that includes a physical representation of a first object; calculating a sequence of first transform values of the physical representation of the first object based on the sequence of images, wherein transform values in the first sequence of transform values indicate a position and an orientation of the physical representation of the first object in the physical scene; storing the sequence of first transform values of the physical representation of the first object on one or more computer-readable media; generating an enhanced scene, wherein the enhanced scene includes the first object; maintaining the first object in the enhanced scene at positions and orientations that are indicated by the transform values in the sequence of first transform values; generating images of the enhanced scene, wherein each of the images of the enhanced scene is generated from a respective observer viewpoint; receiving an indication of selected transform values in the sequence of first transform values of the physical representation of the first object; retrieving the selected transform values from the sequence of first transform values; and generating a replay image of the enhanced scene, from a first observer viewpoint, that shows the first object at the position and orientation that are indicated by the selected transform values.

In one embodiment, a system comprises one or more computer-readable media; and one or more processors that are couple to the computer readable media and that are configured to cause the system to obtain a sequence of images of physical scene that includes a physical representation of a first object; calculate a sequence of first transform values, which are transform values of the physical representation of the first object, wherein transform values in the sequence of first transform values indicate positions and orientations of the physical representation of the first object in the physical scene; store the sequence of first transform values of the physical representation of the first object on the one or more computer-readable media; generate an enhanced scene, wherein the enhanced scene includes the first object; maintain the first object in the enhanced scene at positions and orientations that are indicated by the transform values in the sequence of first transform values; generate an image of the enhanced scene from a first observer viewpoint; receive an indication of selected transform values in the sequence of first transform values of the physical representation of the first object; retrieve the selected transform values from the one or more computer-readable media; and generate a replay image of the enhanced scene, from a second observer viewpoint, that shows the first object at the position and orientation that are indicated by the selected transform values.

In one embodiment, one or more computer-readable media store instructions that, when executed by one or more computing devices, cause the computing devices to perform operations comprising obtaining a sequence of images of a physical scene that includes a physical representation of a first object in the physical scene; calculating a sequence of first transform values of the physical representation of the first object based on the sequence of images, wherein the sequence of first transform values indicates positions and orientations of the physical representation of the first object; storing the sequence of first transform values of the physical representation of the first object on one or more computer-readable media; generating an enhanced scene, wherein the enhanced scene includes the first object; maintaining the first object in the enhanced scene at positions and orientations that are indicated by transform values in the sequence of first transform values; generating an image of the enhanced scene from a first observer viewpoint; receiving an indication of selected transform values in the sequence of first transform values of the physical representation of the first object; retrieving the selected transform values from the one or more computer-readable media; and generating a replay image of the enhanced scene, from a second observer viewpoint, that shows the first object at the position and the orientation that are indicated by the selected transform values.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
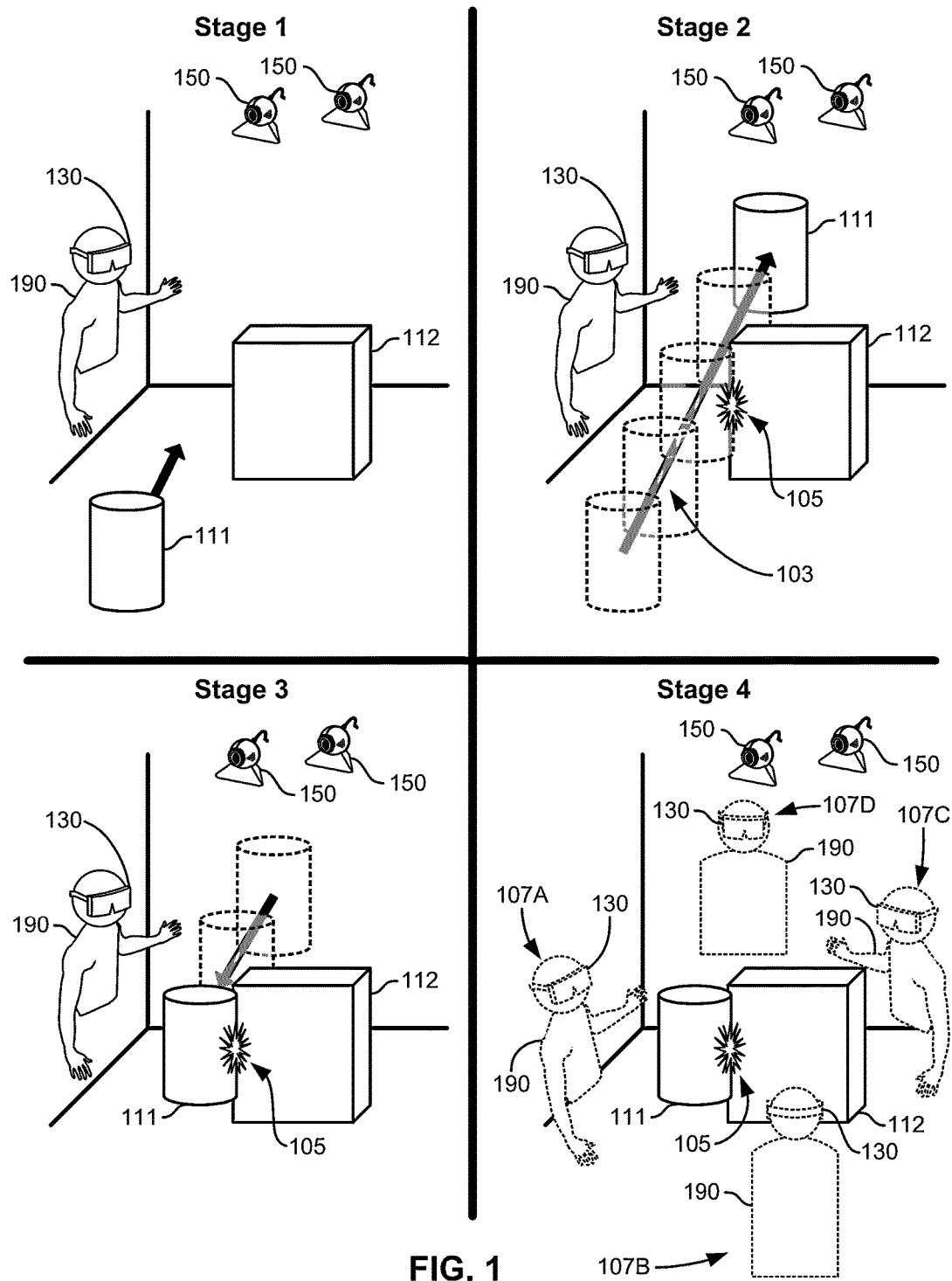
FIG. 1 illustrates an example embodiment of the operations that are performed by a system for examining the interactions of objects in an enhanced scene.

FIG. 1 illustrates an example embodiment of the operations that are performed by a system for examining the interactions of objects in an enhanced scene. The system includes an object-interface device 130 (e.g., a wearable object-interface device), one or more tracking cameras 150, and one or more image-enhancing devices (not shown in FIG. 1). The physical scene of FIG. 1 includes a physical representation of a virtual object 111 (also referred to herein as the "physical representation"), and the enhanced scene that corresponds to the physical scene includes the virtual object that is represented by the physical representation 111 (also referred to herein as the "represented object"). The represented object may be substantially the same shape as the physical representation 111 or may be an entirely different shape. The enhanced scene also includes a virtual object 112 that does not have a physical representation. Thus, for illustrative purposes, FIG. 1 shows aspects of both the physical scene and the enhanced scene.

In stage 1, the physical representation 111 is moved through the scene. The path 103 of the physical representation is shown in stage 2. As the physical representation 111 moves along the path 103, the system records the transform values of the physical representation 111. Transform values describe one or more of the following: position, orientation, and time. Furthermore, the transform values may be stored as sets of transform values. For example, a set of transform values may include the transform values for an object at a particular moment in time. Also, while moving along the path 103, the represented object, although not necessarily the physical representation 111, has a collision 105 with the virtual object 112 in the enhanced scene.

In stage 3, the system uses the recorded transform values of the physical representation 111 to replay the movements of the represented object in the enhanced scene. In this embodiment, the movements of the represented object are replayed in reverse until the image of the enhanced scene again shows the collision 105. In stage 4, the observer 190 moves around the image of the enhanced scene that shows the collision 105 while wearing the object-interface device 130. The system generates images of the represented object and the virtual object 112 from the viewpoints 107A-D of the object-interface device 130. Thus, while wearing the object-interface device 130, the observer 190 can view images of the enhanced scene that show the collision 105 from different viewpoints 107A-D by moving around the collision 105, which changes the viewpoint of the object-interface device 130, which in turn changes the images displayed by the object-interface device 130. Additionally, the physical representation 111 may be located at a different position than the position of the represented object during the replay of the enhanced scene.

For example, an observer 190 may want to determine if a couch will fit through a doorway. The observer 190 may use a physical representation 111 (e.g., a box that is labeled with mixed-reality markers) to represent a couch. Also, the physical scene may include a doorway, or the system may generate a virtual scene that includes a virtual doorway. Then the observer 190 can move the physical representation through the doorway (either the physical doorway or the virtual doorway) and observe the motion of the represented object by means of the display on an object-interface device 130. Thus, when a person (e.g., the observer 190) moves the physical representation, the represented object—which is overlaid on the physical representation—moves accordingly, so in the images of the enhanced scene the person appears to be moving the represented object. Because the system records the movements of the objects in the enhanced scene, the observer 190 can put down the physical representation 111 and rewind the images of the enhanced scene to a time when the couch is halfway through the doorway. The observer 190 may also walk around the enhanced scene while viewing the playback of the enhanced scene on the object-interface device 130 to inspect the couch and the doorway from different viewpoints (e.g., different angles, different distances), which allows the observer 190 to determine if the couch will fit through the doorway. After the observer 190 has finished viewing the playback of the enhanced scene, the observer 190 can return the system to a real-time view of the enhanced scene.

Also, some embodiments allow an object, either a represented object or another virtual object, in the enhanced scene to be moved when the enhanced scene is being replayed. Furthermore, some embodiments will search the stored transform values to find interactions (e.g., collisions, objects coming closer than a threshold distance) in the enhanced scene. Additionally, some embodiments detect interactions while recording the images of the enhanced scene and generate alerts (e.g., visual alerts, audio alerts) to notify the user of the interactions.

Some embodiments of the system also add visual cues to the images of the enhanced scene that show the distances between objects. For example, some embodiments add visual cues that show the shortest distance between the closest points of two objects, and some embodiments add visual cues that show the distance between specific points (e.g., user-selected points) of two objects. Also, some embodiments allow an observer to change the scale of virtual objects, either while recording the enhanced scene or during playback of the enhanced scene.

In the embodiment of FIG. 1, the object-interface device 130 includes a camera and a display device, and the object-interface device 130 can be worn by an observer 190. Furthermore, in some embodiments, the object-interface device 130 includes visual markers, which the system can use to determine (e.g., visually determine) the position and orientation of the object-interface device 130. The system can then use the position and orientation of the object-interface device 130 to determine the viewpoint of the object-interface device 130. Also, the camera of the object-interface device 130 captures images (e.g., still photos, videos) of the physical scene. For example, the images may be visible-light images of the physical scene, which show the physical scene from the perspective of the object-interface device 130. Also, the images may be depth images of the physical scene. Each pixel in a physical-scene depth image has a value that indicates the distance from the camera to the nearest point of a physical object that, from the perspective of the camera, projects to a point that is within the area of the pixel.

The tracking cameras 150 around the physical scene capture images of one or more of the following: the observer 190, the physical representation of a virtual object 111, a physical object, and the object-interface device 130. In this embodiment, the system uses the images from the tracking cameras 150 to detect one or more of the following: transform values of the object-interface device 130, transform values of the physical representation of a virtual object 111, and transform values of a physical object. The transform values of physical representations of virtual objects 111, the transform values of virtual objects 112 that do not have a physical representation, the transform values of represented objects, the transform values of physical objects, and the transform values of the object-interface device 130 can be expressed, at least in part, by coordinates in a world-coordinate system. Thus, the world-coordinate system may define a common coordinate system for a physical scene, a virtual scene, and an enhanced scene.

An image-enhancing device includes one or more computing devices (e.g., desktops, servers, laptops, smart phones, tablet computing devices) and communicates with the tracking cameras 150 and the object-interface device 130 by means of wireless communication links. In some embodiments, the image-enhancing device uses one or more wired communication links in addition to or in alternative to the wireless communication links. Based on the physical scene (e.g., based on the transform values of physical representations 111 and transform values of the object-interface device 130) and on a virtual scene (e.g., based on transform values of virtual objects 112), the image-enhancing device generates images of an enhanced scene that includes the represented object (i.e., the virtual object that is represented by the physical representation 111) and includes another virtual object 112.

Additionally, the image-enhancing device can obtain and store transform values for one or more physical representations 111, for one or more physical objects, and for one or more virtual objects 112. For example, the image-enhancing device may obtain images from the tracking cameras 150 and calculate the transform values of physical representations 111 that are shown in the obtained images. The image-enhancing device may also generate a virtual scene that includes one or more virtual objects 112 and store the transform values of the one or more virtual objects 112. The transform values for the physical representations 111, for the represented objects, and for the virtual objects 112 that do not have a physical representation may be recorded at specific periodic intervals or at other intervals of time (e.g., intervals based on the changes between images from the tracking cameras 150, intervals based on a frame rate of the images from the tracking cameras 150).

Figure 2:
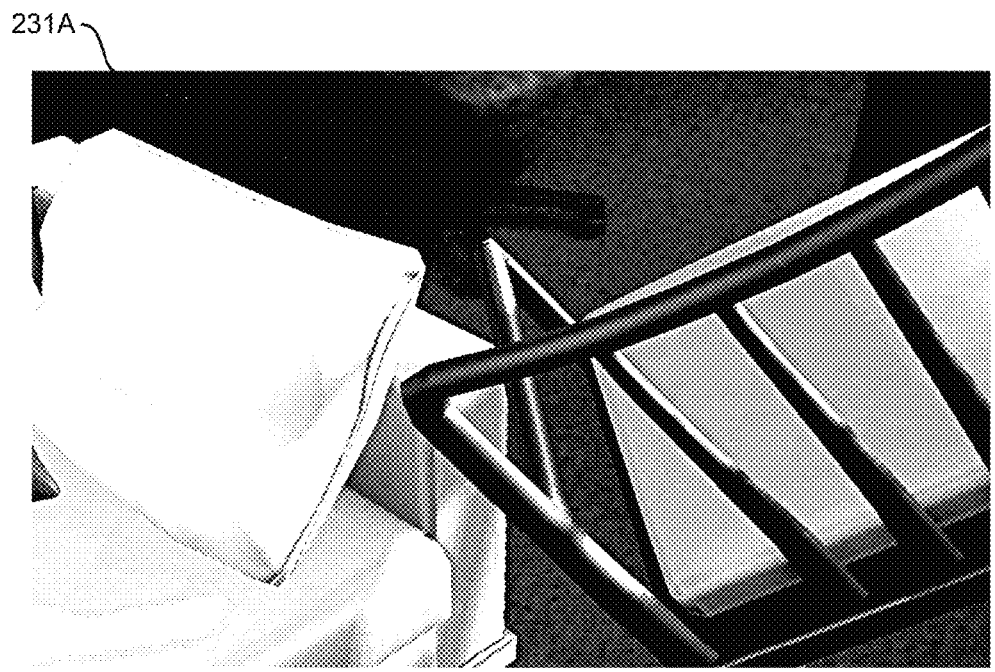
FIG. 2 illustrates example embodiments of images of an enhanced scene.
Figure 2:
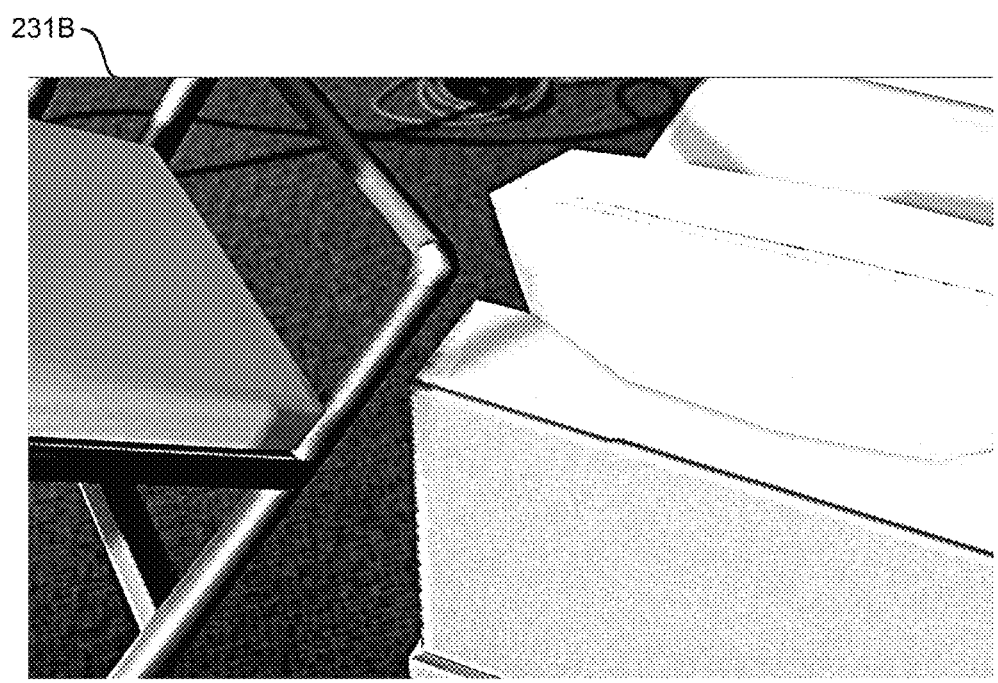

FIG. 2 illustrates example embodiments of images 231A-B of an enhanced scene. The images 231A-B show different viewpoints of a first object and a second object. One of the objects or both of the objects may be represented objects, which have a physical representation in the physical scene that corresponds to the enhanced scene. The images 231A-B may be presented on a display of an object-interface device. As the object-interface device is moved, the viewpoint that the object-interface device has of the enhanced scene changes. As the viewpoint changes, the one or more images that are shown on the display of the object-interface device change to correspond to the viewpoint that the object-interface device has of the enhanced scene. Thus, the first image 231A shows the enhanced scene from a first viewpoint. As the object-interface device is moved around the enhanced scene, the image of the enhanced scene changes. Thus, when the object-interface device arrives at a second location, the second image 231B, which shows the virtual scene from a second viewpoint, is displayed by the object-interface device.

Figure 3A:
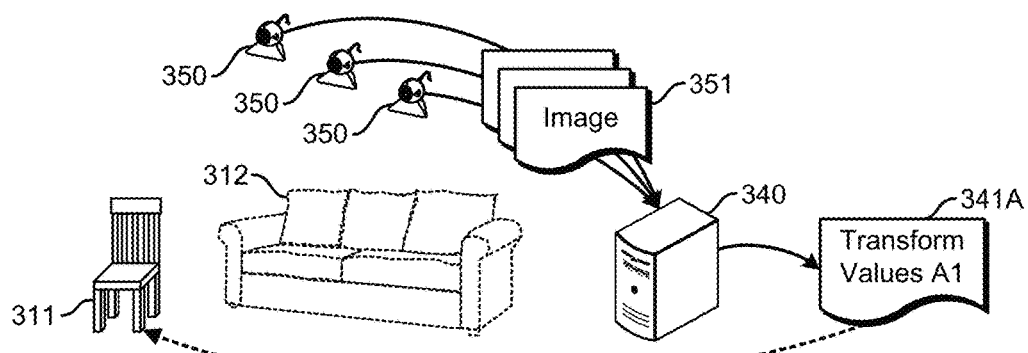
FIGS. 3A-C illustrate examples of the operations that are performed by an embodiment of a system for examining the interactions of objects in an enhanced scene.
Figure 3B:
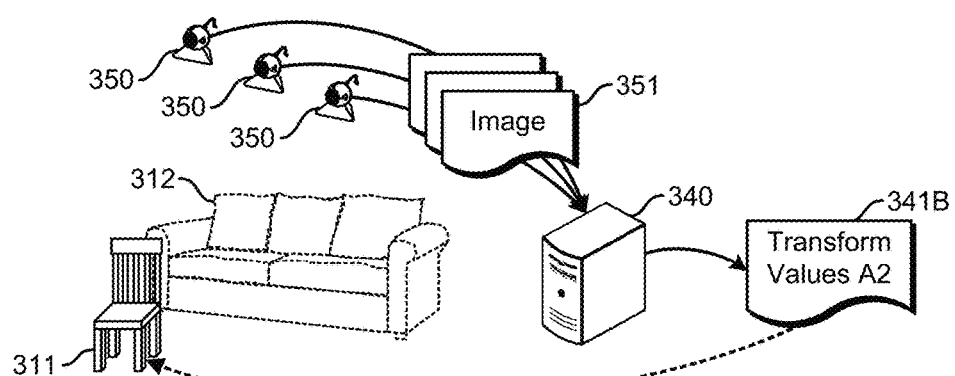
Figure 3C:
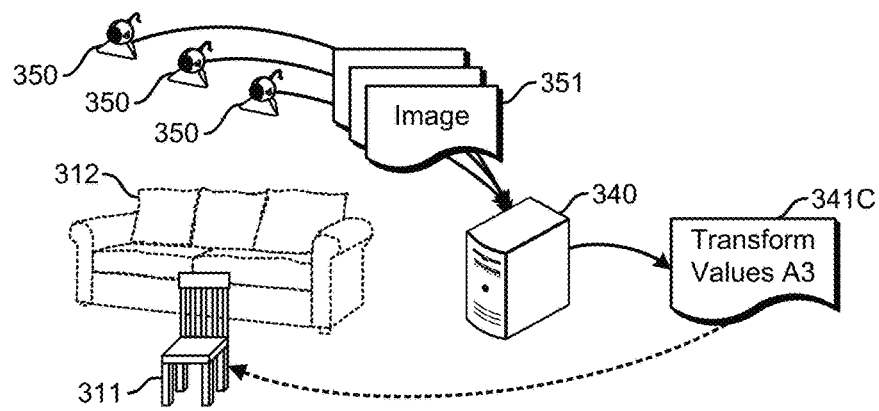

FIGS. 3A-C illustrate examples of the operations that are performed by an embodiment of a system for examining the interactions of objects in an enhanced scene. The system includes tracking cameras 350 and one or more image-enhancing device 340. In FIGS. 3A-C, the physical representation 311 and the represented object have substantially the same shape: a chair. The enhanced scene in FIGS. 3A-C also includes a virtual object 312 that does not have a physical representation.

In FIG. 3A, the tracking cameras 350 capture respective images of a plurality of images 351 of a physical scene. The images 351 are obtained by the image-enhancing device 340. Based on the images 351, the image-enhancing device 340 calculates transform values A1 341A at time t for the physical representation 311 and stores the transform values A1 341A. The transform values A1 341A define the position and orientation of the physical representation 311 or the position and orientation of the represented object at time t.

In FIG. 3B, the tracking cameras 350 again capture respective images of a plurality of images 351 of the physical scene. In the physical scene, the physical representation 311 has moved relative to FIG. 3A. Again, the images 351 are obtained by the image-enhancing device 340, and, based on the images 351, the image-enhancing device 340 calculates transform values A2 341B at time t+n for the physical representation 311 and stores the transform values A2 341B.

Additionally, in FIG. 3C, the tracking cameras 350 capture respective images of a plurality of images 351 of the physical scene. In the physical scene, the physical representation 311 has moved relative to FIG. 3A and FIG. 3B. Again, the images 351 are obtained by the image-enhancing device 340, and, based on the images 351, the image-enhancing device 340 calculates transform values A3 341C at time t+2n for the physical representation 311 and stores the transform values A3 341C. Thus, the image-enhancing device 340 stores transform values A1 341A, transform values A2 341B, and transform values A3 341C.

Figure 4:
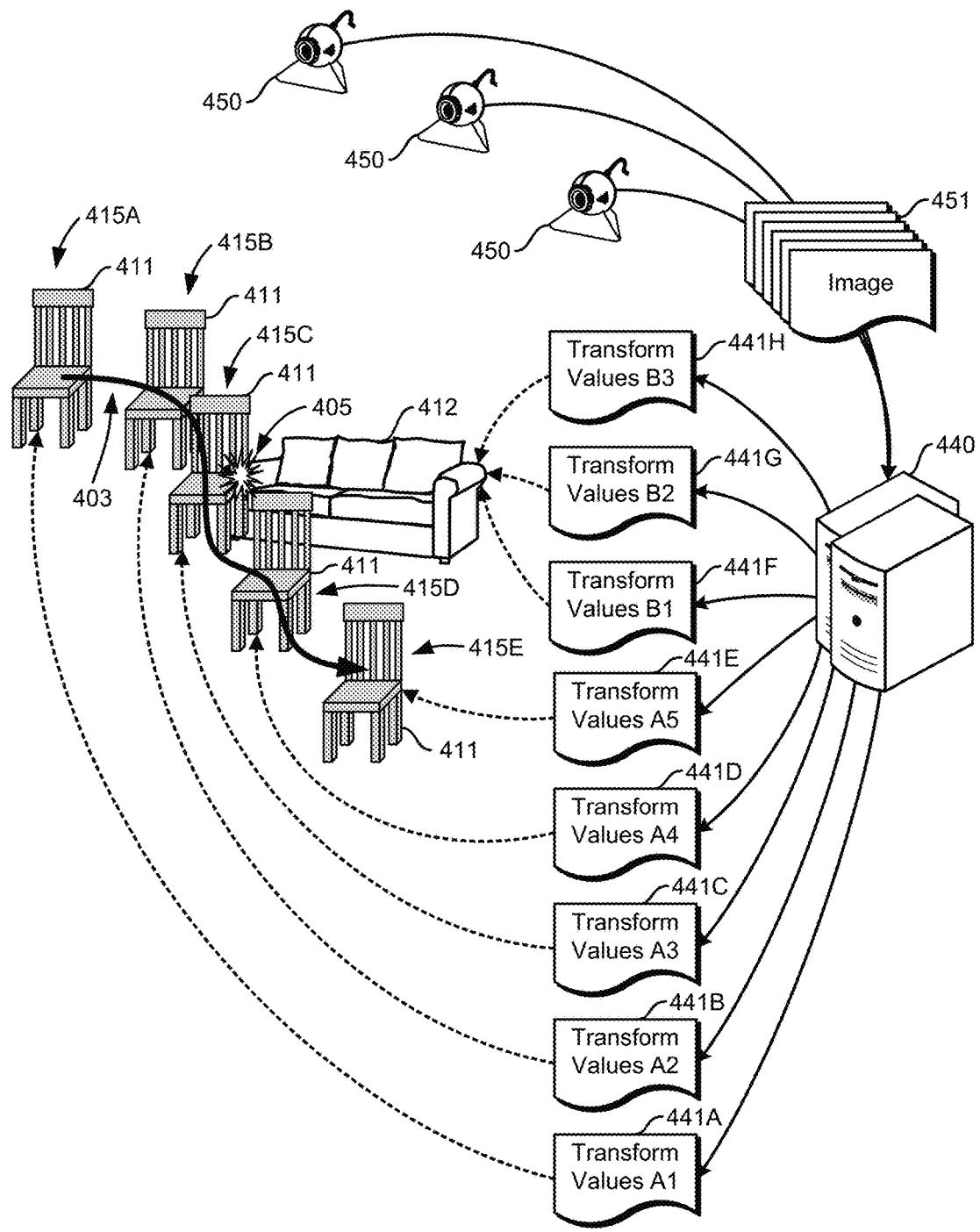
FIG. 4 illustrates examples of the operations that are performed by an embodiment of a system for examining the interactions of objects in an enhanced scene.

FIG. 4 illustrates examples of the operations that are performed by an embodiment of a system for examining the interactions of objects in an enhanced scene. The system includes tracking cameras 450 and one or more image-enhancing devices 440. In FIG. 4, the physical representation 411 and the represented object have substantially the same shape: a chair. The enhanced scene in FIG. 4 also includes a virtual object 412 that does not have a physical representation. The system generates and records transform values 441A-E for the physical representation 411 or for the represented object as the physical representation 411 moves along a path 403. The image-enhancing device 440 obtains images 451 when the physical representation 411 is at a first position 415A at time t and generates first transform values A1 441A for the physical representation 411 or the represented object based on the images 451. Next, the image-enhancing device 440 obtains images 451 when the physical representation 411 is at a second position 415B at time t+1 and generates second transform values A2 441B for the physical representation 411 or the represented object based on the images 451. Then the image-enhancing device 440 obtains images 451 when physical representation 411 is at a third position 415C at time t+2 and generates third transform values A3 441C for the physical representation 411 or the represented object based on the images 451. While in the third position 415C, the represented object has a collision 405 with the virtual object 412. Also, the system performs these operations to generate the fourth transform values A4 441D when the physical representation 411 is at a fourth position 415D, which is at time t+3, and to generate the fifth transform values A5 441E when the physical representation 411 is at a fifth position 415E, which is at time t+4. The system may then store the transform values (transform values A1 441A to transforms value A5 441E) in a sequence of transform values. Additionally, the system may store transform values A1 441A to transform values A5 441E in association with the physical representation 411 or the represented object.

Additionally, some embodiments add an interaction indicator to the images of the enhanced scene that show the collision 405, generate an audio alert while displaying images of the enhanced scene that show the collision 405, or generate a haptic alert while displaying images of the enhanced scene that show the collision 405.

Furthermore, the system generates and stores transform values 441F-H for a virtual object 412. Because the virtual object 412 does not move in these images 451, the system does not generate and store transform values 441 for the virtual object 412 as frequently as the system generates and stores transform values 441 for the physical representation 411 or the represented object. Thus, for example, transform values B1 441F may be generated at time t+1, transform values B2 441G may be generated at time t+4, and transform values B3 441H may be generated at time t+6.

Figure 5:
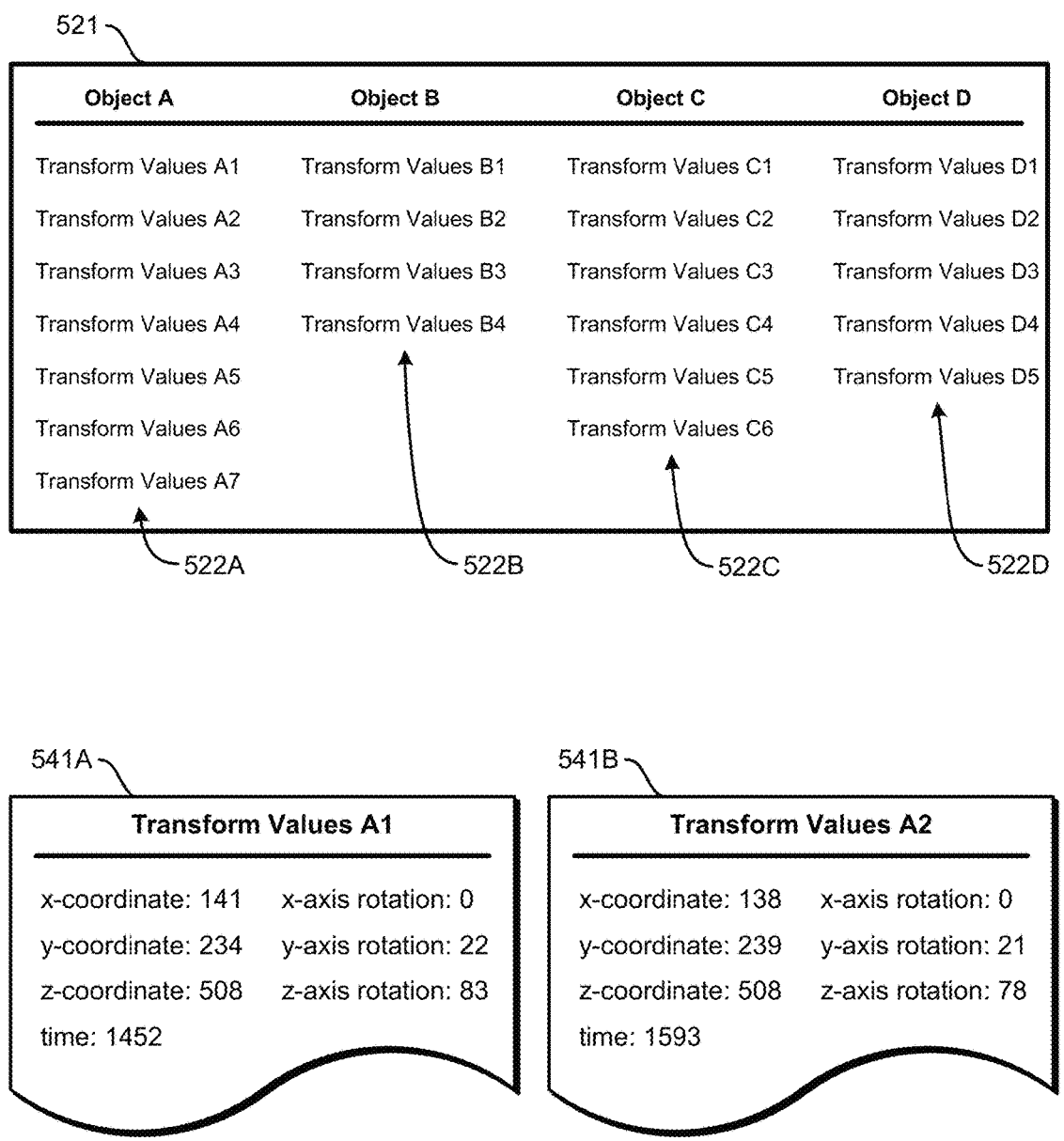
FIG. 5 illustrates example embodiments of transform values and sequences of transform values.

FIG. 5 illustrates example embodiments of transform values and sequences of transform values 522A-D. A sequence repository 521 stores respective sequences of transform values 522A-D for object A, object B, object C, and object D. The sequences 522A-D may be used to reconstruct the paths of the movements of their respective objects. Also, in this embodiment, the sequences 522A-D do not include the same number of transform values. In some embodiments, the different numbers of transform values is caused by different rates of generating and storing the transform values for the objects, even though the transform values are generated and stored during the same interval of time. For example, during a particular interval of time, transform values for object A may be generated and stored more frequently than transform values for object D are generated and stored.

The first transform values A1 541A (which may be stored as a set of transform values) include an x-coordinate, a y-coordinate, a z-coordinate, an x-axis rotation, a y-axis rotation, and a z-axis rotation, in addition to the time for which the coordinates and rotations were calculated. Likewise, the second transform values A2 541B (which may also be stored as a set of transform values) include an x-coordinate, a y-coordinate, a z-coordinate, an x-axis rotation, a y-axis rotation, and a z-axis rotation, in addition to the time for which the coordinates and rotations were calculated. Also, some embodiments include a sequence-order number, which indicates a position in a sequence, in addition to or in alternative to the time.

Figure 6:
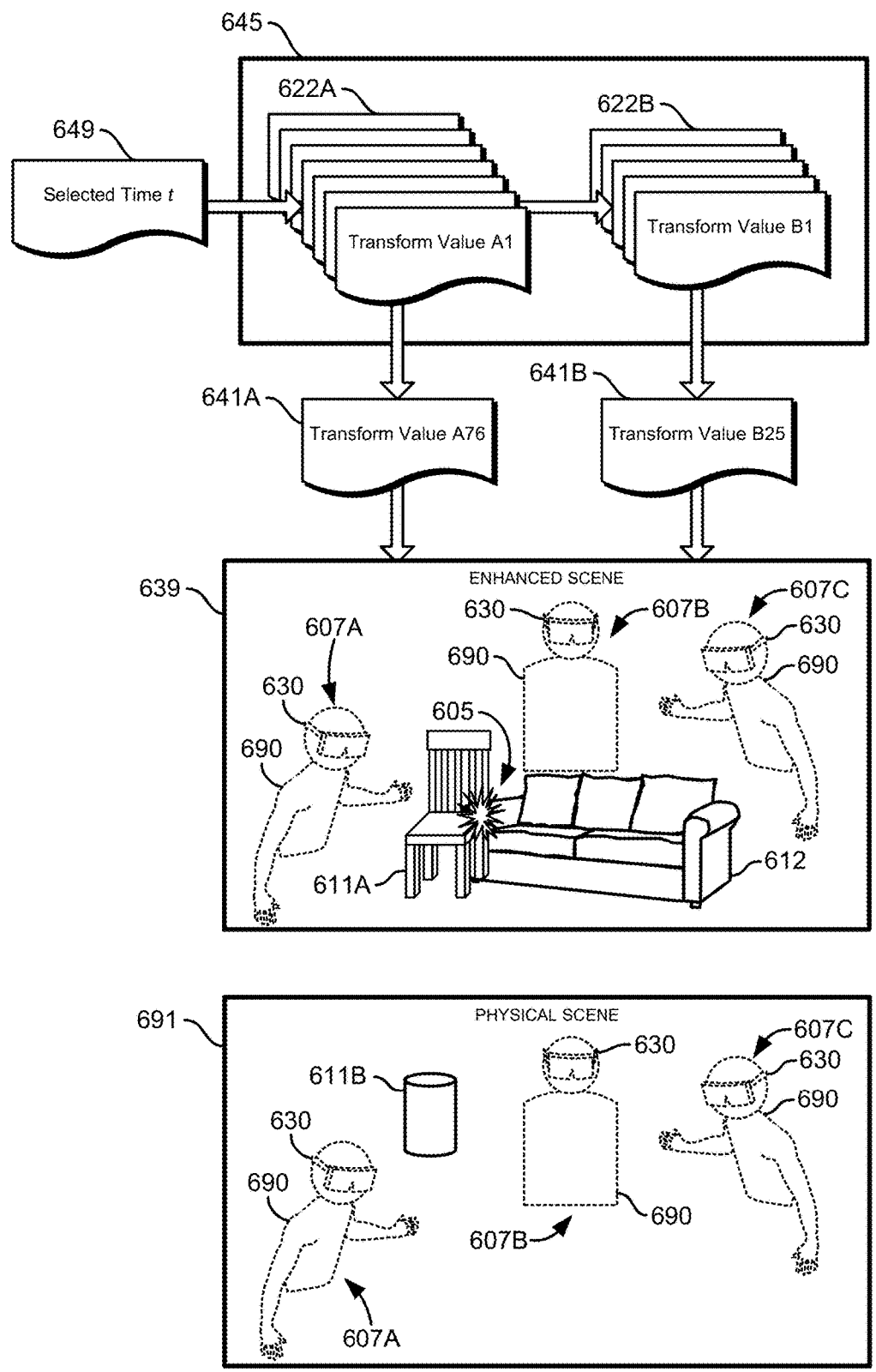
FIG. 6 illustrates examples of the operations that are performed by an embodiment of a system for examining the interactions of objects in an enhanced scene.

FIG. 6 illustrates examples of the operations that are performed by an embodiment of a system for examining the interactions of objects in an enhanced scene. The system obtains a selected time t 649 and searches a repository 645, which includes a sequence of transform values 622A for a first object, which is a represented object 611A, and a sequence of transform values 622B for a second object, which is a virtual object 612 that does not have a physical representation, to find the transform values for the first object and the transform values for the second object that correspond to the selected time t 649. In this example, the transform values for the first object are transform values A76 641A and the transform values for the second object are transform values B25 641B. Also, the transform values that correspond to a selected time t may be a set of transform values for time t.

Next, the system uses transform values A76 641A and transform values B25 641B to generate an image of an enhanced scene 639. The image of the enhanced scene 639 shows the represented object 611A and the virtual object 612, which have a collision 605. An observer 690 who is wearing an object-interface device 630 may observe the represented object 611A, the virtual object 612, and the collision 605 by moving to different viewpoints, for example a first viewpoint 607A, a second viewpoint 607B, and a third viewpoint 607C.

Because the system is re-creating the image of the enhanced scene as the enhanced scene appeared at the selected time t 649, at the time that the image of the enhanced scene 639 is re-created, the location of the physical representation 611B in the physical scene 691 may be different than the location of the represented object 611A in the enhanced scene 639. Thus, in the physical scene 691, the physical representation 611B, which in this embodiment has a substantially different shape than the represented object 611A, has a different location than the location of the represented object 611A in the re-created enhanced scene 639.

Figure 7:
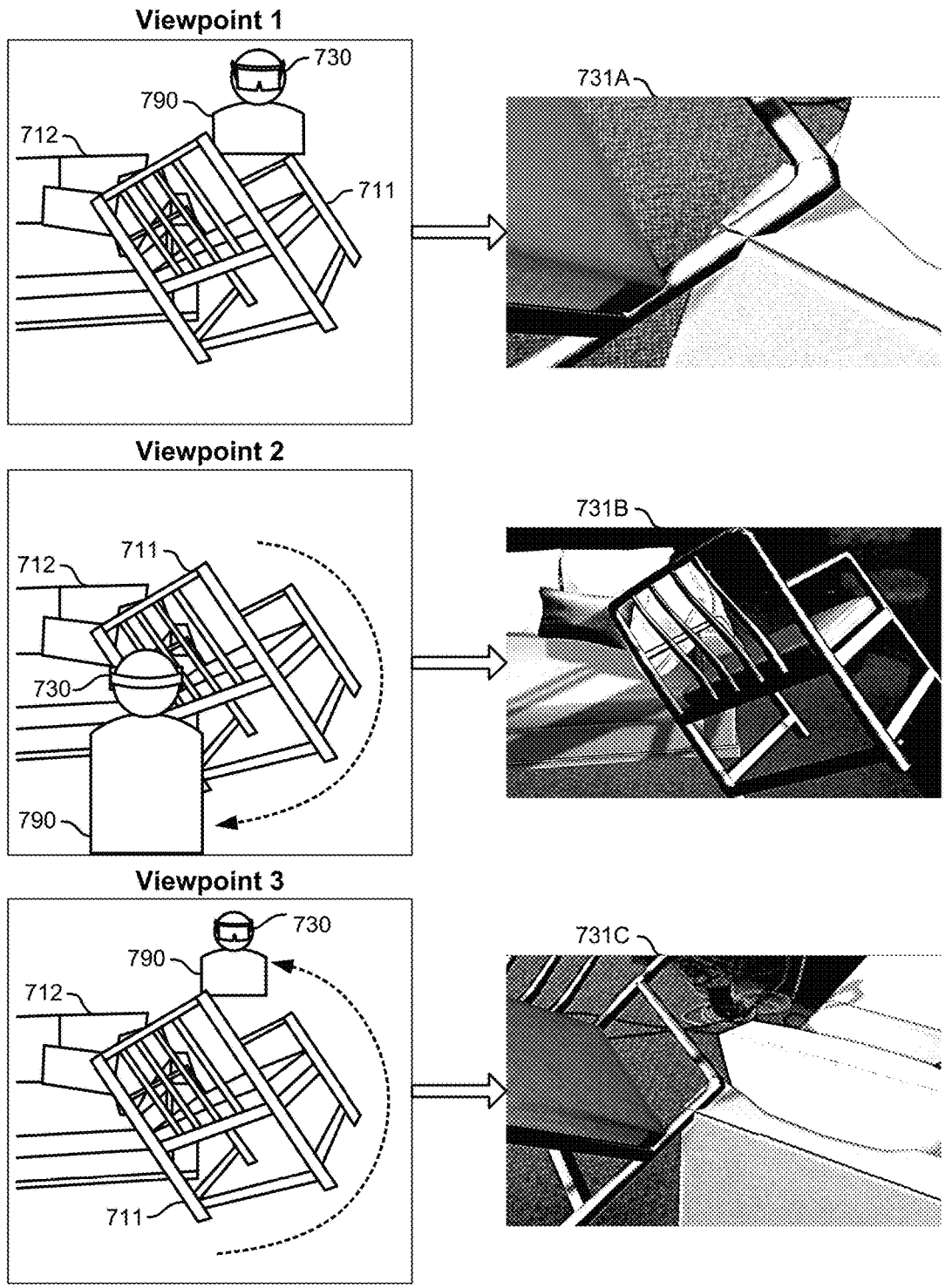
FIG. 7 illustrates example embodiments of images of an enhanced scene.

FIG. 7 illustrates example embodiments of images of an enhanced scene. The images 731A-C illustrate an enhanced scene from three different viewpoints. The enhanced scene includes two objects: a represented object 711, which is a chair, and a virtual object 712 that does not have a physical representation, which is a couch. The two objects are shown from different perspectives according to the different viewpoints.

The first image 731A shows a collision of the represented object 711 and the virtual object 712 from a first viewpoint, viewpoint 1. The second image 731B shows the collision of the represented object 711 and the virtual object 712 from a second viewpoint, viewpoint 2. Also, the third image 731C shows the collision of the represented object 711 and the virtual object 712 from a third viewpoint, viewpoint 3.

The first image 731A is generated when an observer 790 views the enhanced scene with an object-interface device 730 that is in a first location, which has viewpoint 1. The observer 790 then moves the object-interface device 730 to a second location, which has viewpoint 2, and the second image 731B is generated when the object-interface device 730 is in the second location. Finally, the observer 790 moves the object-interface device 730 to a third location, which has viewpoint 3, and the third image 731C is generated when the object-interface device 730 is in the third location.

Figure 8:
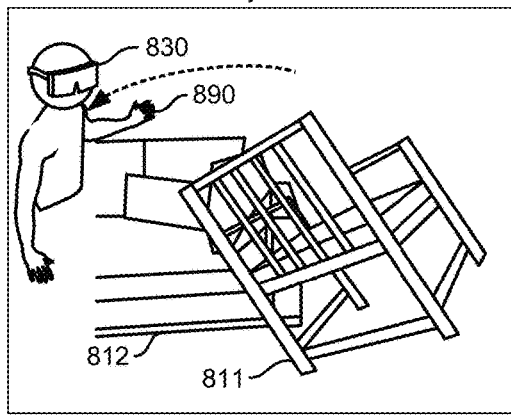
FIG. 8 illustrates example embodiments of images of an enhanced scene.
Figure 8:
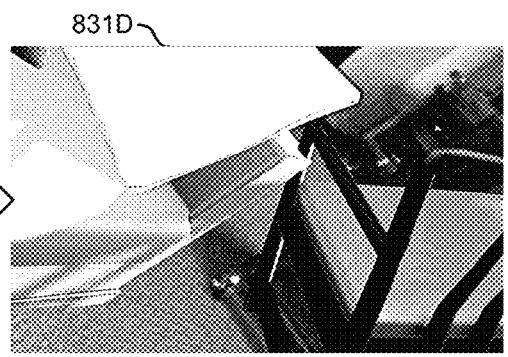
Figure 8:
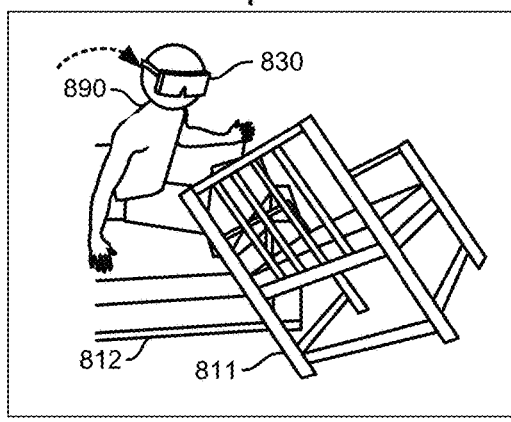
Figure 8:
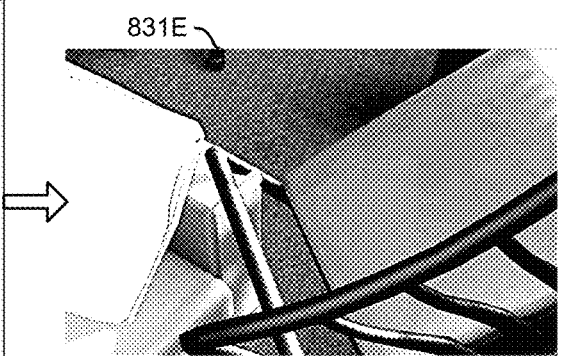
Figure 8:
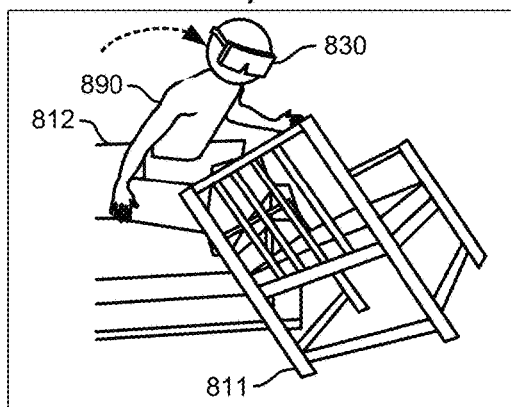
Figure 8:
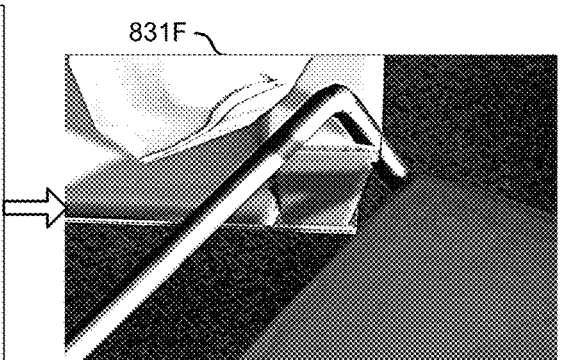

FIG. 8 also illustrates example embodiments of images of an enhanced scene. The images 831D-F illustrate the enhanced scene that is shown in FIG. 7 from three additional viewpoints: viewpoint 4, viewpoint 5, and viewpoint 6. In FIG. 8, the fourth image 831D is generated after the observer 890 has moved the object-interface device 830 from the third location to a fourth location, which has viewpoint 4. The fourth image 831D shows a collision of the represented object 811 and the virtual object 812 from viewpoint 4. The observer 890 then moves the object-interface device 830 to a fifth location, which has viewpoint 5. The fifth image 831E, which shows the collision of the represented object 811 and the virtual object 812 from viewpoint 5, is generated when the object-interface device 830 is in the fifth location. Also, the observer 890 then moves the object-interface device 830 to a sixth location, which has viewpoint 6. The sixth image 831F, which shows the collision of the represented object 811 and the virtual object 812 from viewpoint 6, is generated when the object-interface device 830 is in the sixth location.

Therefore, by means of the stored transform values, the system allows the observer 890 to view the enhanced scene from different perspectives by moving the object-interface device 830 to different locations. This allows the observer 890 to inspect objects and their interactions (e.g., collisions, passing close by each other), from various perspectives by moving the object-interface device 830 even after the physical representation has been moved elsewhere. Accordingly, an observer 890 can walk around and inspect a replay of a represented object and another virtual object similar to the way that the observer 890 can walk around and inspect physical objects. For example, the observer 890 can move an object-interface device 830 closer to objects or object interactions in order to inspect them more closely. Additionally, because the physical representations can be located elsewhere, the viewpoints that the observer 890 can use to inspect the objects and their interactions are not constrained by physical objects. For example, the observer 890 may stand inside or walk through a represented object or another virtual object while viewing the enhanced scene.

Figure 9:
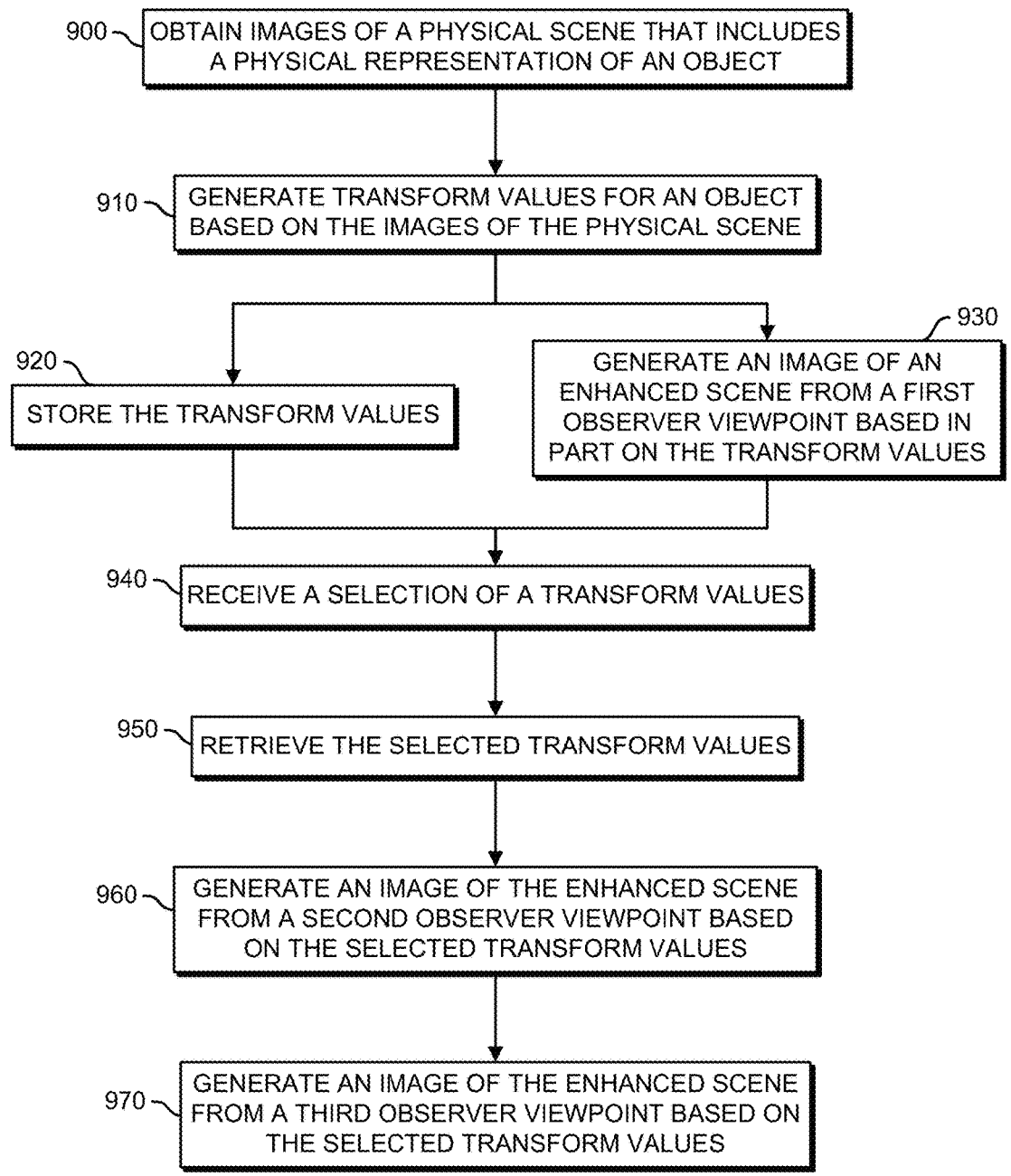
FIG. 9 illustrates an example embodiment of an operational flow for generating images of an enhanced scene.

FIG. 9 illustrates an example embodiment of an operational flow for generating images of an enhanced scene. The blocks of this operational flow and the other operational flows that are described herein may be performed by one or more computing devices, for example the computing devices described herein. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks. Furthermore, the blocks of the operational flows that are described herein may be combined with the blocks of other operational flows.

The flow starts in block 900, where images of a physical scene that includes a physical representation of an object are obtained, for example from one or more tracking cameras. Next, in block 910, transform values are generated for an object (e.g., a physical representation of an object, a represented object, a virtual object that does not have a physical representation) based on the images of the physical scene. The flow then moves to block 920 and block 930, which may be performed concurrently.

In block 920, the transform values are stored by one or more computing devices. In block 930, an image of an enhanced scene is generated from a first observer viewpoint based in part on the stored transform values. The operations of block 930 may include generating a virtual scene and may include determining a location of an object-interface device, which may then be used to determine the first observer viewpoint.

After blocks 920 and 930, the flow moves to block 940, where a selection of transform values is obtained. The transform values may be selected by selecting a time that corresponds to the transform values. For example, if time 51 is selected, then the transform values that correspond to time 51 will be designated as selected transform values. Next, in block 950, the selected transform values are retrieved. Following, in block 960, an image of the enhanced scene that shows the enhanced scene from a second observer viewpoint is generated based on the selected transform values. Finally, in block 970, an image of the enhanced scene that shows the enhanced scene from a third observer point of view is generated based on the selected transform values.

Figure 10:
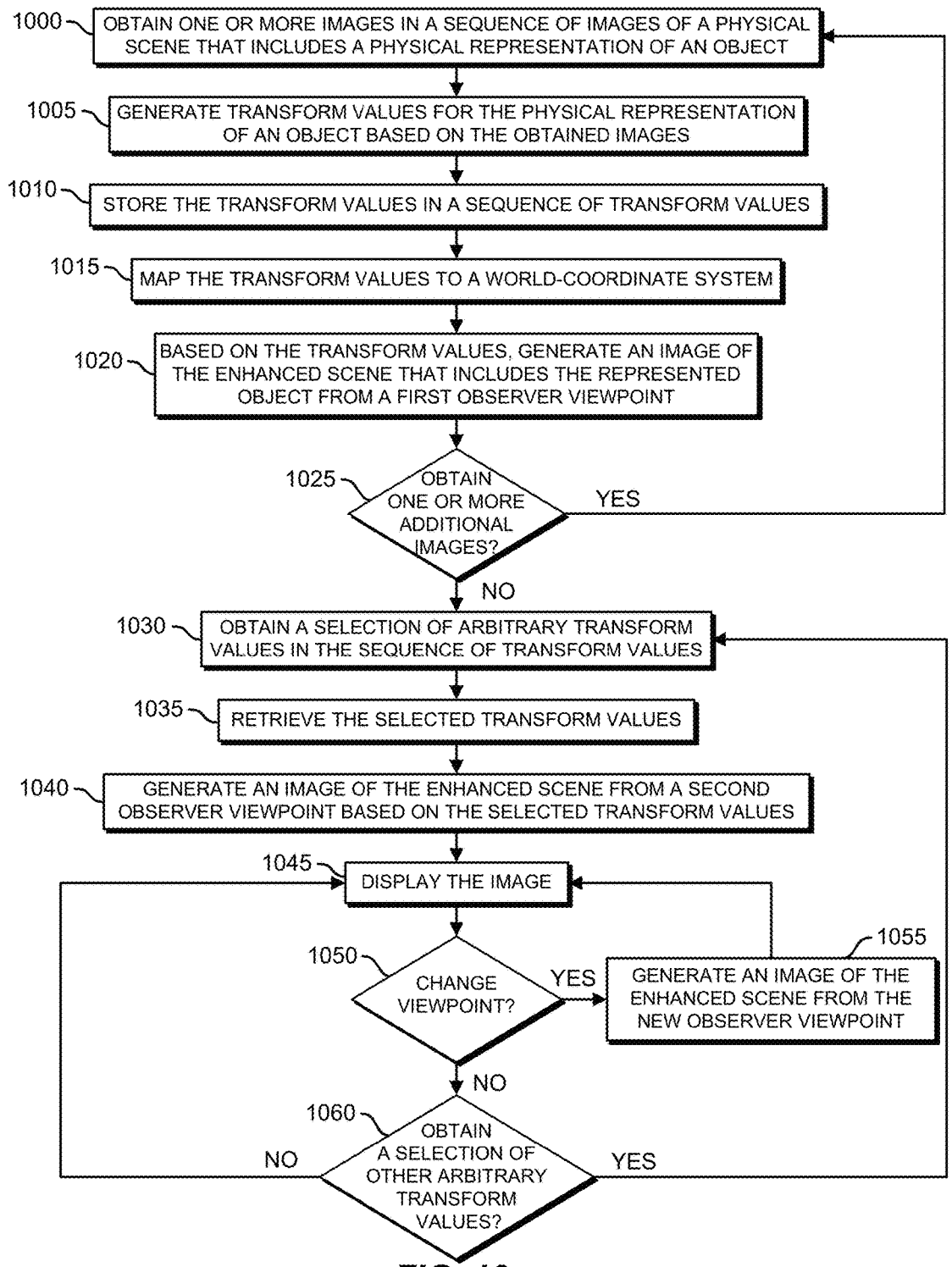
FIG. 10 illustrates an example embodiment of an operational flow for generating images of an enhanced scene.

FIG. 10 illustrates an example embodiment of an operational flow for generating images of an enhanced scene. The flow starts in block 1000, where one or more images in a sequence of images are obtained. The images show a physical scene that includes a physical representation of an object. The flow then moves to block 1005, where transform values for the physical representation of the object or for the represented object are generated based on the obtained images. Next, in block 1010, the transform values are stored in a sequence of transform values. The sequence of transform values may be a sequence of transform values for the physical representation of the object or the represented object, may be a sequence of transform values for the entire physical scene that includes transform values for all of the objects and physical representations of objects in the physical scene, or may be a sequence of transform values for the entire enhanced scene that includes transform values for all of the objects (e.g., virtual objects that do not have a physical representation, represented objects, physical representations) in the enhanced scene.

Following, in block 1015, the transform values are mapped to a world-coordinate system. Next, in block 1020, an image of the enhanced scene is generated from a first observer viewpoint. The image includes the represented object, and the image is generated based on the transform values and on the first observer viewpoint. The operations of block 1020 may include determining the transform values of an object-interface device. And when the first observer viewpoint is the viewpoint of the location of the object-interface device, the image of the enhanced scene is generated based on the transform values of the object-interface device, as well as on the transform values of the physical representation of the object.

The flow then proceeds to block 1025, where it is determined if one or more additional images are to be obtained. If yes (block 1025=yes), for example when an observer is still watching a live view of the enhanced scene, then the flow returns to block 1000. If not (block 1025=no), then the flow moves to block 1030, where a selection of arbitrary transform values (e.g., transform values at a selected time t) in the sequence of transform values is obtained. For example, a set of transform values for the selected time t, which includes the transform values that were stored for a time at or near time t, may be obtained. Next, in block 1035, the selected transform values (e.g., the set of transform values for the selected time t) are retrieved. The flow then moves to block 1040, where an image of the enhanced scene from a second observer viewpoint is generated based on the selected transform values. The flow then proceeds to block 1045, where the image is displayed.

Next, in block 1050, it is determined if the viewpoint of the enhanced scene is to be changed. If yes (block 1050=yes), for example when a change is made to the location of the object-interface device that displays the image of enhanced scene, then the flow moves to block 1055, where an image of the enhanced scene from the new observer viewpoint is generated, and then the flow returns to block 1045. If not (block 1050=no), then the flow moves to block 1060, where it is determined if a selection of other arbitrary transform values is obtained. If not (block 1060=no), then the flow returns to block 1045. If yes (block 1060=yes), then the flow returns to block 1030, where another selection of arbitrary transform values is obtained. Therefore, a single selection of transform values can be used to generate images of the enhanced scene that show the enhanced scene from different viewpoints.

Figure 11:
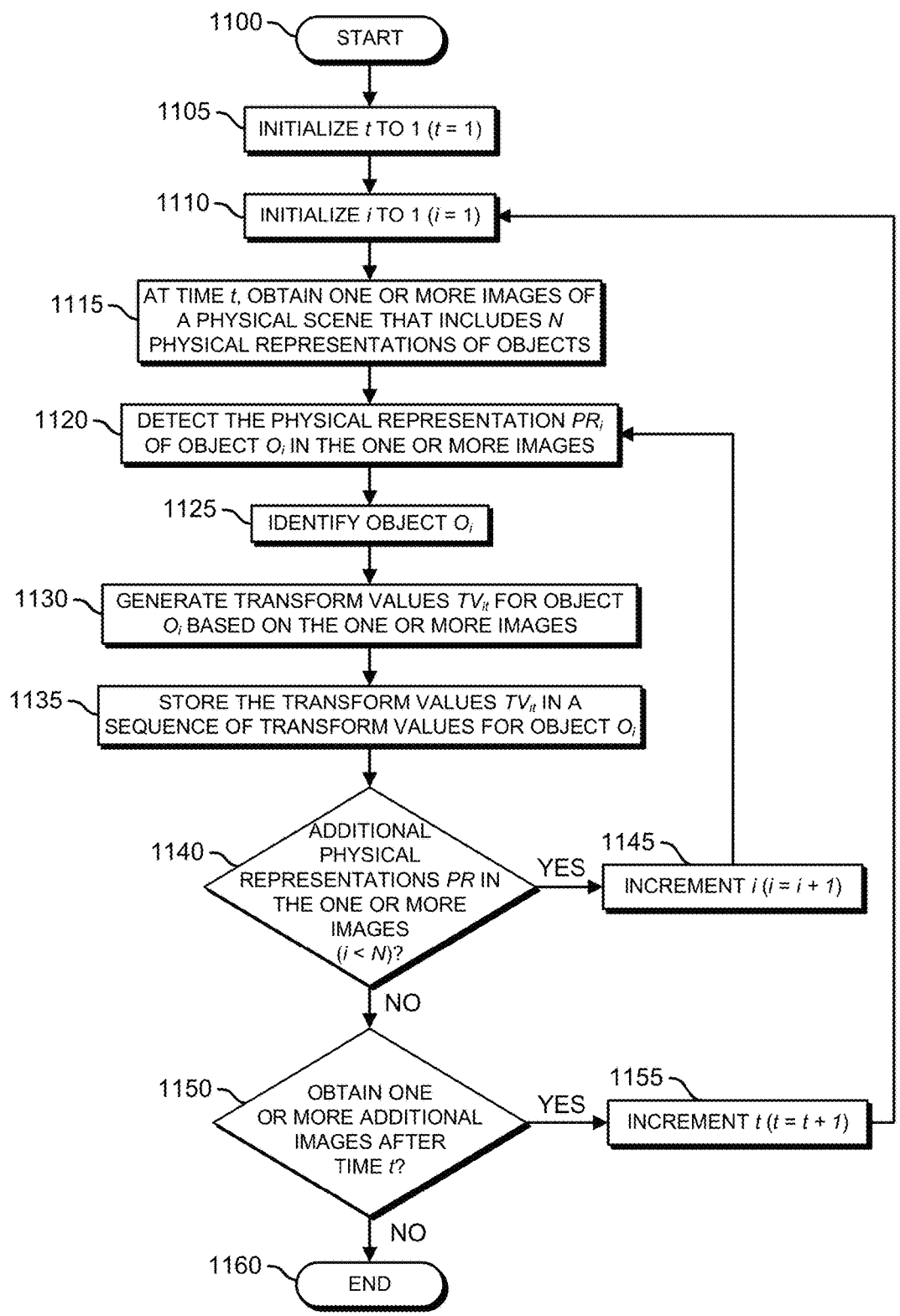
FIG. 11 illustrates an example embodiment of an operational flow for storing transform values.

FIG. 11 illustrates an example embodiment of an operational flow for storing transform values. In some other embodiments of the operational flow that is shown in FIG. 11, the objects are tracked in one or more groups of objects. The flow starts in block 1100, and then moves to block 1105, where a timing counter t is initialized to 1. Next, in block 1110, an object counter i is initialized to 1. The flow then proceeds to block 1115, where, at time t, one or more images of a physical scene are obtained. The physical scene includes N physical representations of objects.

The flow then moves to block 1120, where the physical representation $PR_i$ of object $O_i$ is detected in the one or more images. Next, in block 1125, object $O_i$ is identified based on the physical representation $PR_i$. The flow then proceeds to block 1130, where transform values $TV_{it}$ (e.g., a set of transform values) are generated for object $O_i$ based on the one or more images. The transform values $TV_{it}$ may include the time t. The flow then moves to block 1135, where the transform values $TV_{it}$ are stored in a sequence of transform values for object $O_i$. The flow then proceeds to block 1140.

In block 1140, it is determined if there are additional physical representations in the one or more images for which transform values have not been generated. If yes (block 1140=yes), then the flow proceeds to block 1145, where the object counter i is incremented, and then the flow returns to block 1120. If not (block 1140=no), then the flow moves to block 1150.

In block 1150, it is determined if one or more additional images are obtained after time t. For example, additional images may be obtained when tracking cameras are capturing a video of a physical scene. If yes (block 1150=yes), then t is incremented in block 1155, and then the flow returns to block 1110. If not (block 1150=no), then the flow moves to block 1160, where the flow ends.

Figure 12:
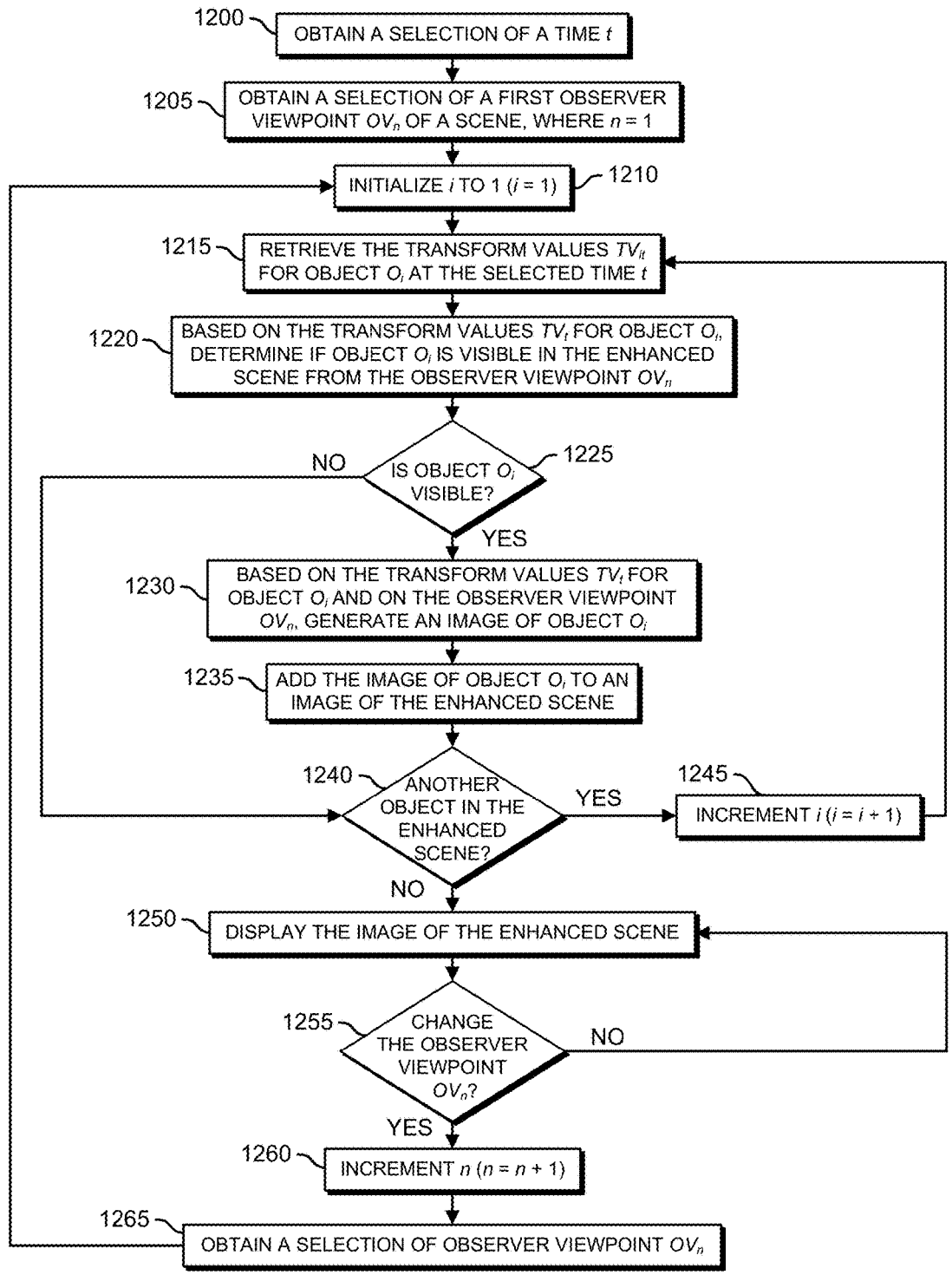
FIG. 12 illustrates an example embodiment of an operational flow for generating images of an enhanced scene.

FIG. 12 illustrates an example embodiment of an operational flow for generating images of an enhanced scene. The flow starts in block 1200, where a selection of a time t is obtained. Next, in block 1205, a selection of a first observer viewpoint $OV_n$ of a scene is obtained, where n=1. The first observer viewpoint $OV_n$ may be selected by moving an object-interface device to a desired location. In some embodiments, the observer viewpoint $OV_n$ of the object-interface device will be used automatically, which may allow an observer to select a new observer viewpoint OV by merely moving the object-interface device.

The flow then moves to block 1210, where an object counter i is initialized to 1. Next, in block 1215, the transform values $TV_{it}$ for object $O_i$ at the selected time t are retrieved. The flow then moves to block 1220 where, based on the transform values $TV_{it}$ for object $O_i$ at the selected time t, it is determined whether the object $O_i$ is visible in the enhanced scene from the observer viewpoint $OV_n$. Next, in block 1225, the next block is selected based on whether the object $O_i$ is visible. If the object is not visible (block 1225=no), then the flow moves to block 1240. If the object is visible (block 1225=yes), then the flow proceeds to block 1230.

In block 1230, an image of object $O_i$ is generated based on the transform values $TV_{it}$ for object $O_i$ and on the observer viewpoint $OV_n$. The image of object $O_i$ shows object $O_i$ from the perspective of the observer viewpoint $OV_n$. Next, in block 1235, the image of object $O_i$ is added to an image of the enhanced scene. As an image of an object is added to the image of the enhanced scene, the depths of the all of the objects in the enhanced scene may be accounted for. Thus, if an object obstructs another object from the perspective of the viewpoint $OV_n$, then the image of the enhanced scene will account for the obstruction.

The flow the moves to block 1240, where it is determined if there is another object in the enhanced scene that has not been evaluated. If yes (block 1240=yes), then the flow moves to block 1245, where the object counter i is incremented, and then the flow returns to block 1215. If not (block 1240=no), then the flow moves to block 1250, where the image of the enhanced scene is displayed.

After block 1250, the flow moves to block 1255, where it is determined if the observer viewpoint $OV_n$ should be changed (e.g., if the location of the object-interface device has changed). If not (block 1255=no), then the flow returns to block 1250. If yes (block 1255=yes), then the flow moves to block 1260. In block 1260, the viewpoint counter n is incremented. The flow then moves to block 1265, where a selection of observer viewpoint $OV_n$ is obtained, and then the flow returns to block 1210.

Figure 13:
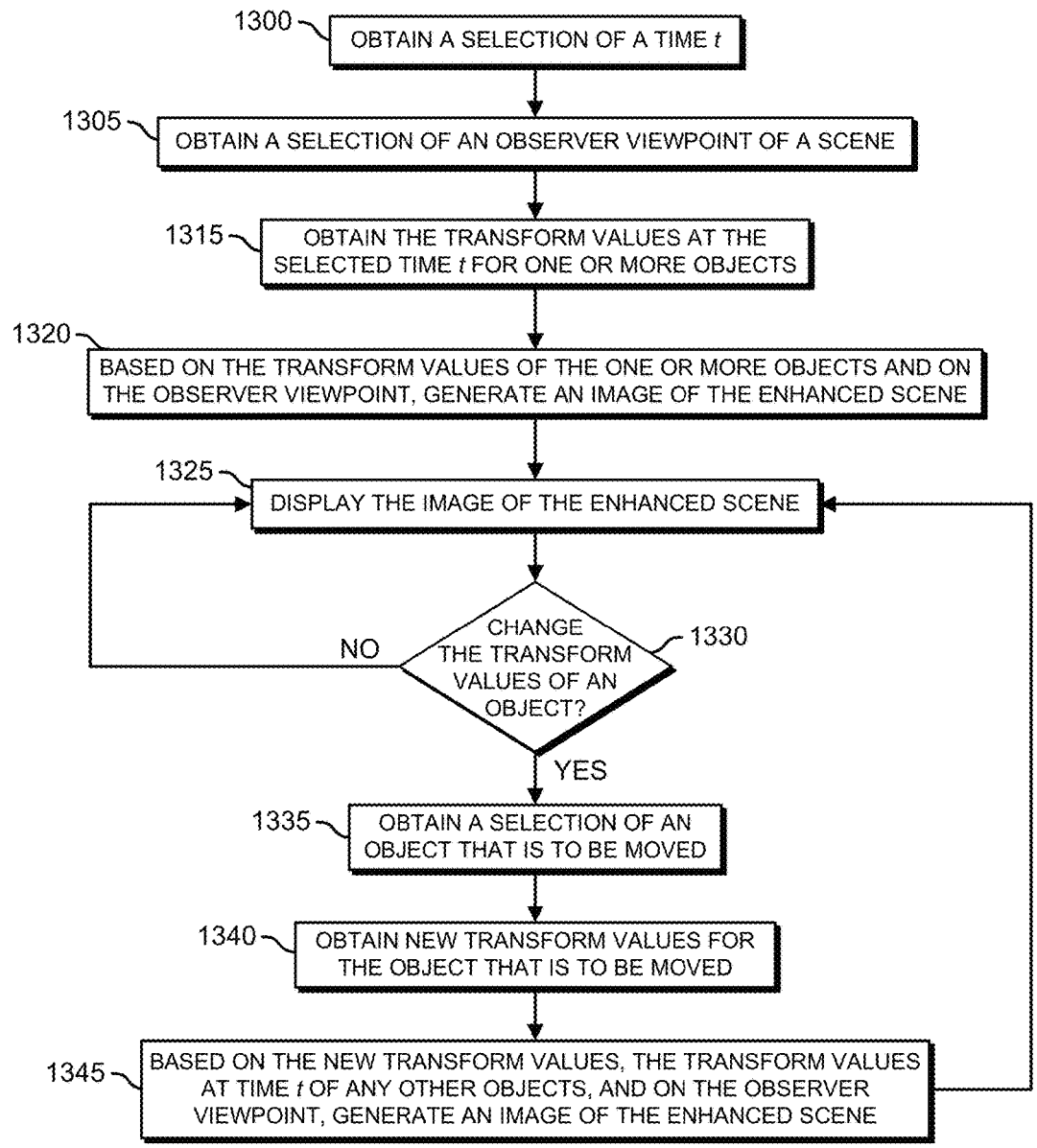
FIG. 13 illustrates an example embodiment of an operational flow for generating images of an enhanced scene.

FIG. 13 illustrates an example embodiment of an operational flow for generating images of an enhanced scene. This operational flow allows the locations of objects in the enhanced scene to be changed while the enhanced scene is being replayed. The flow starts in block 1300, where a selection of a time t is obtained. The flow then moves to block 1305, where a selection of an observer viewpoint of a scene is obtained. Next, in block 1315, the transform values at the selected time t are obtained for one or more objects. The flow proceeds to block 1320 where, based on the transform values for the one or more objects and on the observer viewpoint, an image of the enhanced scene is generated. The flow then moves to block 1325, where the image of the enhanced scene is displayed.

Next, in block 1330, it is determined if one or more of the transform values of an object (e.g., a represented object, a virtual object that does not have a physical representation) are to be changed. If not (block 1330=no), then the flow returns to block 1325. If yes (block 1330=yes), then the flow moves to block 1335.

In block 1335, the selection of an object that is to be moved is obtained. Next, in block 1340, the new one or more transform values for the object that is to be moved are obtained. The flow then moves to block 1345, where an image of the enhanced scene is generated based on the new transform values, on the transform values at time t of any other objects, and on the observer viewpoint. The flow then returns to block 1325.

Figure 14:
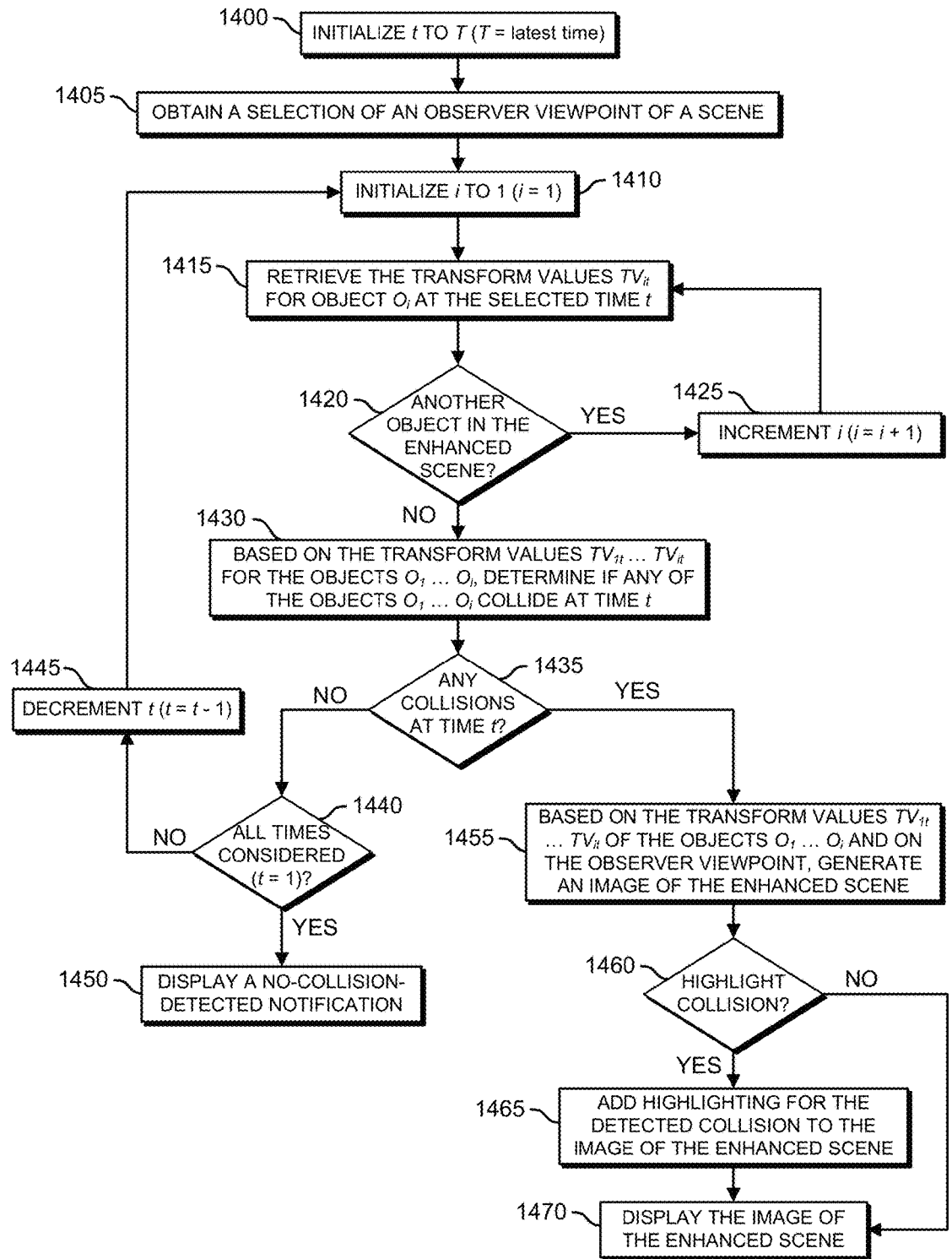
FIG. 14 illustrates an example embodiment of an operational flow for examining interactions in an enhanced scene.

FIG. 14 illustrates an example embodiment of an operational flow for examining interactions in an enhanced scene. The flow starts in block 1400, where a time counter t is initialized to T, where T is the latest time for which transform values have been stored. The flow then moves to block 1405, where a selection of an observer viewpoint of a scene is obtained. Next, in block 1410, an object counter i is initialized to 1. The flow then moves to block 1415, where the transform values $TV_{it}$ for object $O_i$ at time t are retrieved.

The flow then moves to block 1420, where it is determined if there is another object in the enhanced scene. If yes (block 1420=yes), then the flow moves to block 1425, where the object counter i is incremented, and then the flow returns to block 1415. If not (block 1420=no), then the flow moves to block 1430. In block 1430, it is determined if any of the objects $O_1 \ldots O_i$ collide at time t based on the transform values $TV_{1t} \ldots TV_{it}$ of the objects $O_1 \ldots O_i$. Additionally, some embodiments determine if the objects $O_1 \ldots O_i$ have other interactions than collisions. The flow then moves to block 1435, where the next block is selected based on whether any collisions were detected. If no collision was detected (block 1435=no), then the flow moves to block 1440. If one or more collisions (or other interactions) were detected (block 1435=yes), then the flow moves to block 1455.

In block 1440, it is determined if all times for which transform values have been stored have been considered. If yes (block 1440=yes), then the flow moves to block 1450, where a no-collision-detected notification is displayed. If not (block 1440=no), then the flow moves to block 1445. In block 1445, the time t is decremented. In embodiments where the transform values are searched starting with the earliest time and then moving to the latest time T, the time t is incremented. The flow then returns to block 1410.

In block 1455, an image of the enhanced scene is generated based on the transform values $TV_{1t} \ldots TV_{it}$ of the objects $O_1 \ldots O_i$ and on the observer viewpoint. Thus, the image of the enhanced scene shows the enhanced scene when the enhanced scene includes two or more colliding objects. Next, in block 1460, it is determined if the collision is to be highlighted in the image of the enhanced scene. If not (block 1460=no), then the flow proceeds to block 1470. If yes (block 1460=yes), then the flow moves to block 1465, where highlighting for the detected collision is added to the enhanced scene. For example, shading or coloring may be added to the colliding objects, the colliding objects may be made to blink, or an arrow that points to the collision may be added to the scene. Also, some embodiments generate an audio alert or use haptics (e.g., a controller that vibrates) to generate alerts. The flow then moves to block 1470. Finally, in block 1470, the image of the enhanced scene is displayed.

Figure 15:
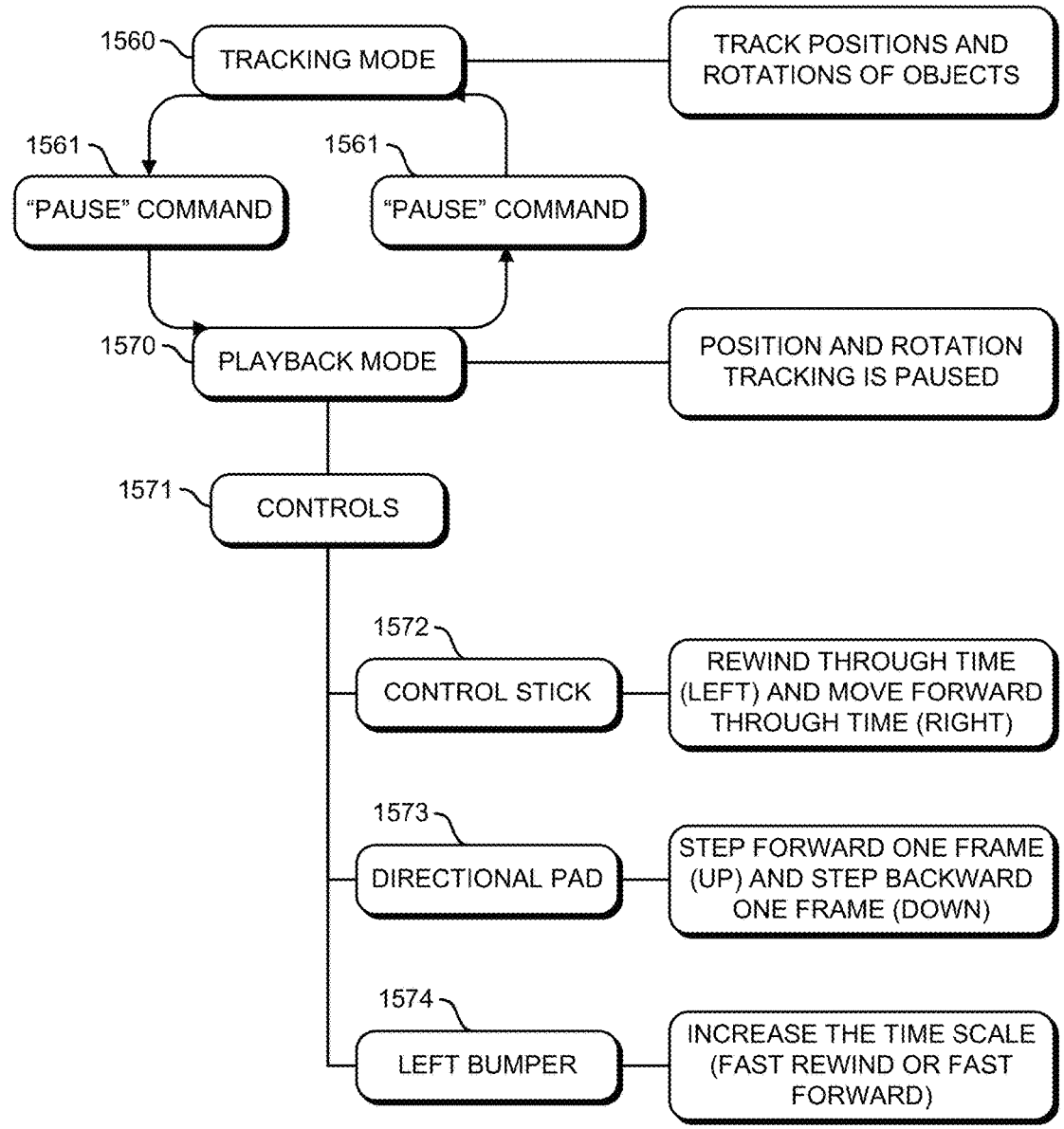
FIG. 15 illustrates an example embodiment of the modes and the control commands in a system for examining the interactions of objects in an enhanced scene.

FIG. 15 illustrates an example embodiment of the modes and control commands in a system for examining the interactions of objects in an enhanced scene. The system includes at least two modes: tracking mode 1560 and playback mode 1570. A "pause" command 1561 causes the system to change between the tracking mode 1560 and the playback mode 1570. While in the tracking mode 1560, the system tracks the positions and rotations of one or more virtual objects that do not have physical representations, of physical representations, and of represented objects. While in the playback mode 1570, the system pauses the tracking of the positions and rotations of the virtual objects that do not have physical representations, of the physical representations, and of the represented objects.

Also, while in playback mode 1570, the controls 1571 of the system are configured as follows: A control stick 1572 signals the system to rewind through time (e.g., in response to a "left" command) or to move forward through time (e.g., in response to a "right" command). A directional pad 1573 signals the system to step forward one frame or time interval (e.g., in response to an "up" command) and to step backward one frame or time interval (e.g., in response to a "down" command). Finally, a left bumper 1574 signals the system to increase the time scale that the system uses in rewind or move forward (e.g., for a fast rewind, for a fast forward).

Figure 16:
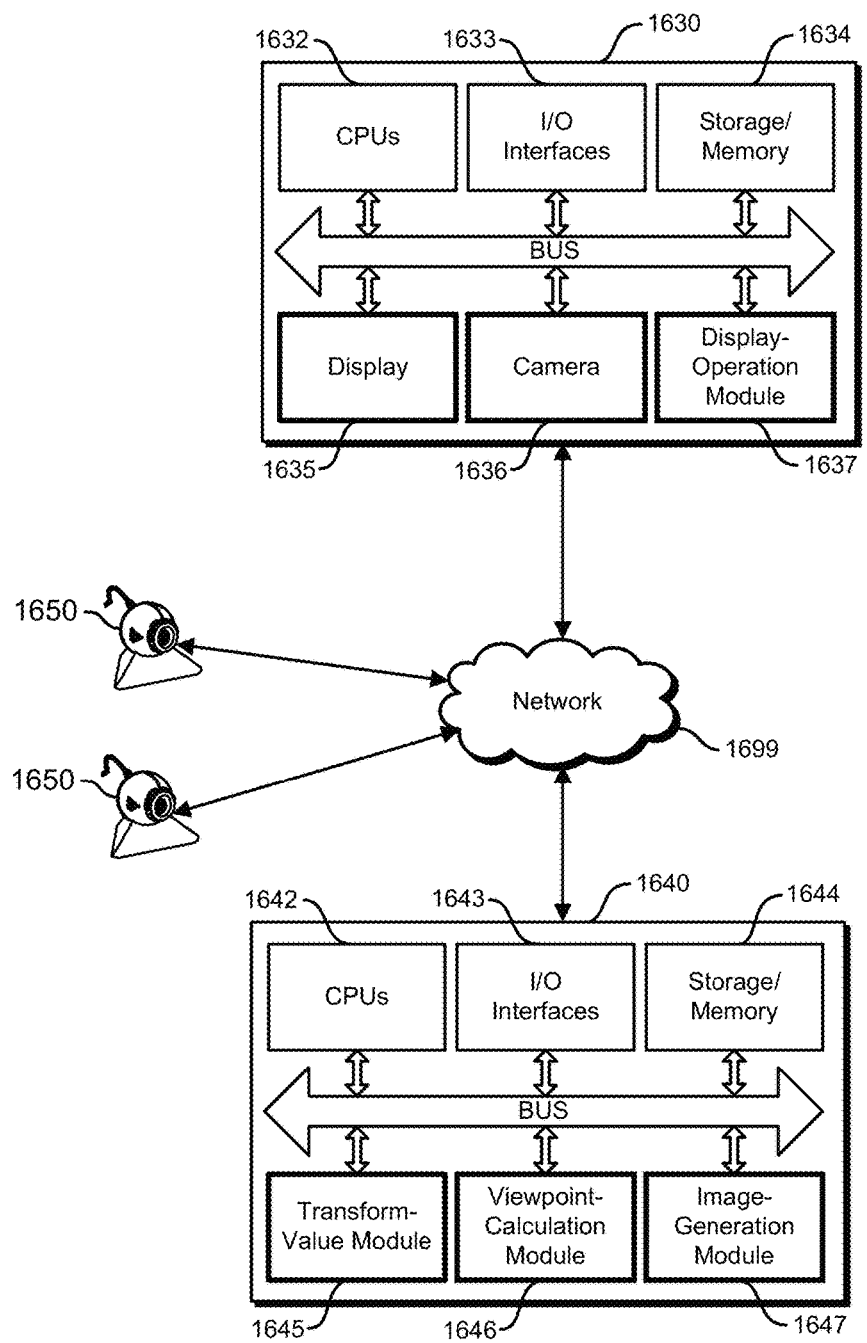
FIG. 16 illustrates an example embodiment of a system for examining the interactions of objects in an enhanced scene.

FIG. 16 illustrates an example embodiment of a system for examining the interactions of objects in an enhanced scene. The system includes an image-enhancing device 1640, an object-interface device 1630, and one or more tracking cameras 1650. In this embodiment, the devices communicate by means of one or more networks 1699, which may include a wired network, a wireless network, a LAN, a WAN, a MAN, and a PAN. Also, in some embodiments the devices may communicate through direct wired connections or direct wireless connections.

The image-enhancing device 1640 includes one or more processors (CPUs) 1642, one or more I/O interfaces 1643, and storage/memory 1644. The CPUs 1642 include one or more central processing units, which include microprocessors (e.g., a single core microprocessor, a multi-core microprocessor) or other circuits, and the CPUs 1642 are configured to read and perform computer-executable instructions, such as instructions in storage, in memory, or in a module. The I/O interfaces 1643 include communication interfaces to input and output devices, which may include a keyboard, a display, a mouse, a printing device, a touch screen, a light pen, an optical-storage device, a scanner, a microphone, a camera, a drive, a controller (e.g., a joystick, a control pad), and a network (either wired or wireless).

The storage/memory 1644 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 1644 can store computer-readable data or computer-executable instructions. The components of the image-enhancing device 1640 communicate via a bus.

The image-enhancing device 1640 also includes a transform-value module 1645, a viewpoint-calculation module 1646, and an image-generation module 1647. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules.

The transform-value module 1645 includes instructions that, when executed, or circuits that, when activated, cause the image-enhancing device 1640 to obtain one or more images from the tracking cameras 1650, detect physical representations of objects in the one or more images, calculate respective transform values for the physical representations of the objects or for the objects, and send the transform values to the storage/memory 1644 or another repository.

The viewpoint-calculation module 1646 includes instructions that, when executed, or circuits that, when activated, cause the image-enhancing device 1640 to receive viewpoint-location information from one or more devices (e.g., the object-interface device or from the tracking cameras) and calculate a viewpoint of the enhanced scene based on the viewpoint-location information. For example, the instructions may cause the image-enhancing device 1640 to receive images of the object-interface device 1630 from the tracking cameras 1650, to calculate the position and orientation of the object-interface device 1630 based on the received images, and to calculate the viewpoint of the enhanced scene based on the position and orientation of the object-interface device 1630.

The image-generation module 1647 includes instructions that, when executed, or circuits that, when activated, cause the image-enhancing device 1640 to generate images of the enhanced scene. The images may be based on a viewpoint that is received from the viewpoint-calculation module 1646 and be based on transform values (e.g., transform values of object representations) that are received from the transform-value module 1645.

The object-interface device 1630 includes one or more CPUs 1632, I/O interfaces 1633, storage/memory 1634, a display 1635, a camera 1636, and a display-operation module 1637. The display-operation module 1637 includes instructions that, when executed, or circuits that, when activated, cause the object-interface device 1630 to obtain images of a physical scene by means of the camera 1636, receive images of an enhanced scene from the image-enhancing device 1640, and display images of the enhanced scene on the display 1635.

Figure 17:
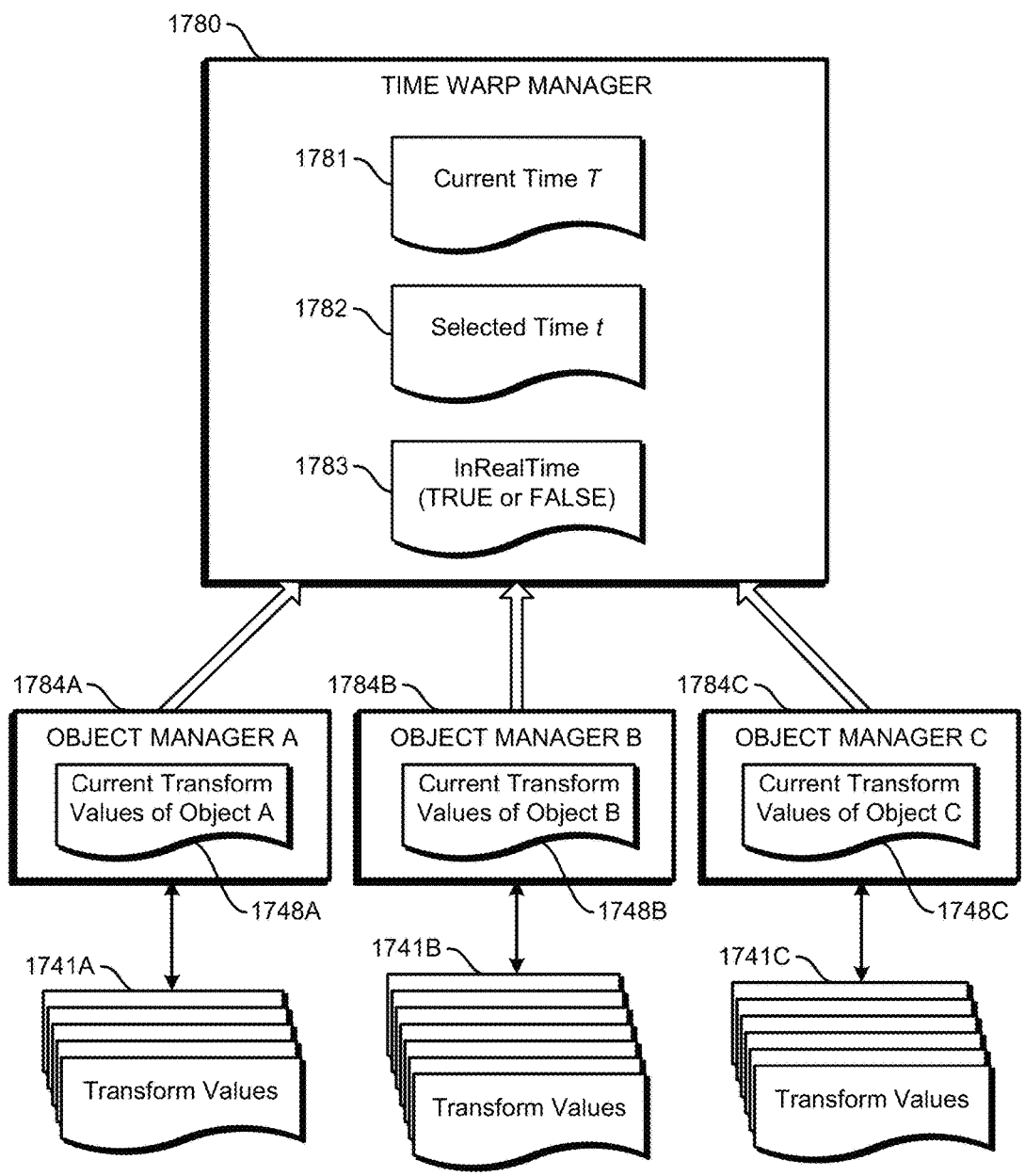
FIG. 17 illustrates an example embodiment of components of a system for examining the interactions of objects in an enhanced scene.

FIG. 17 illustrates an example embodiment of components of a system for examining the interactions of objects in an enhanced scene. The system includes a time warp manager 1780 and one or more object managers 1784A-C. The time warp manager 1780 and the one or more object managers 1784A-C may be implemented by the transform-value module 1645 in FIG. 16.

The time warp manager 1780 maintains a current time T 1781, a selected time t 1782, and a real-time indicator InRealTime 1783, which can have the Boolean values TRUE or FALSE. The time warp manager 1780 constantly updates the current time T 1781 to show the current time. Also, the time warp manager 1780 updates the selected time t 1782 to the time for which a selection has been most recently received. Finally, the time warp manager 1780 updates InRealTime 1783 to TRUE when a request to change to real time has been received and updates InRealTime 1783 to FALSE when a request to change out of real time (e.g., into playback mode) has been received.

The object managers 1784A-C each manage the transform values for a respective object. The object managers 1784A-C in this embodiment obtain and store transform values 1741A-C for their respective objects when InRealTime 1783 is set to TRUE. Also, the object managers 1784A-C maintain the current transform values of their respective objects (e.g., object manager 1784C maintains current transform values of object C 1748C) at the transform values that are at or near the selected time t 1782 when InRealTime 1783 is set to FALSE. The current transform values of an object are the transform values that the system uses to generate an image of the object in an enhanced scene. Thus, changing the current transform values of an object will change the position of the object in images of the enhanced scene.

For example, when InRealTime is set to TRUE, object manager A 1784A continually obtains the transform values 1741A for object A. When obtaining new transform values 1741A for object A, object manager A 1784A may retrieve the current time T 1781 from the time warp manager 1780 and add the current time T 1781 to the transform values 1741A. When InRealTime 1783 is set to FALSE, object manager A 1784A obtains the selected time t 1782 and sets the current transform values of object A 1748A to the transform values in the stored transform values 1741A for object A that are closest to the selected time t 1782. As the selected time t 1782 is updated, object manager A 1784A updates the current transform values of object A 1748A to the transform values in the stored transform values 1741A for object A that are closest to the newly selected time t 1782.

Figure 18:
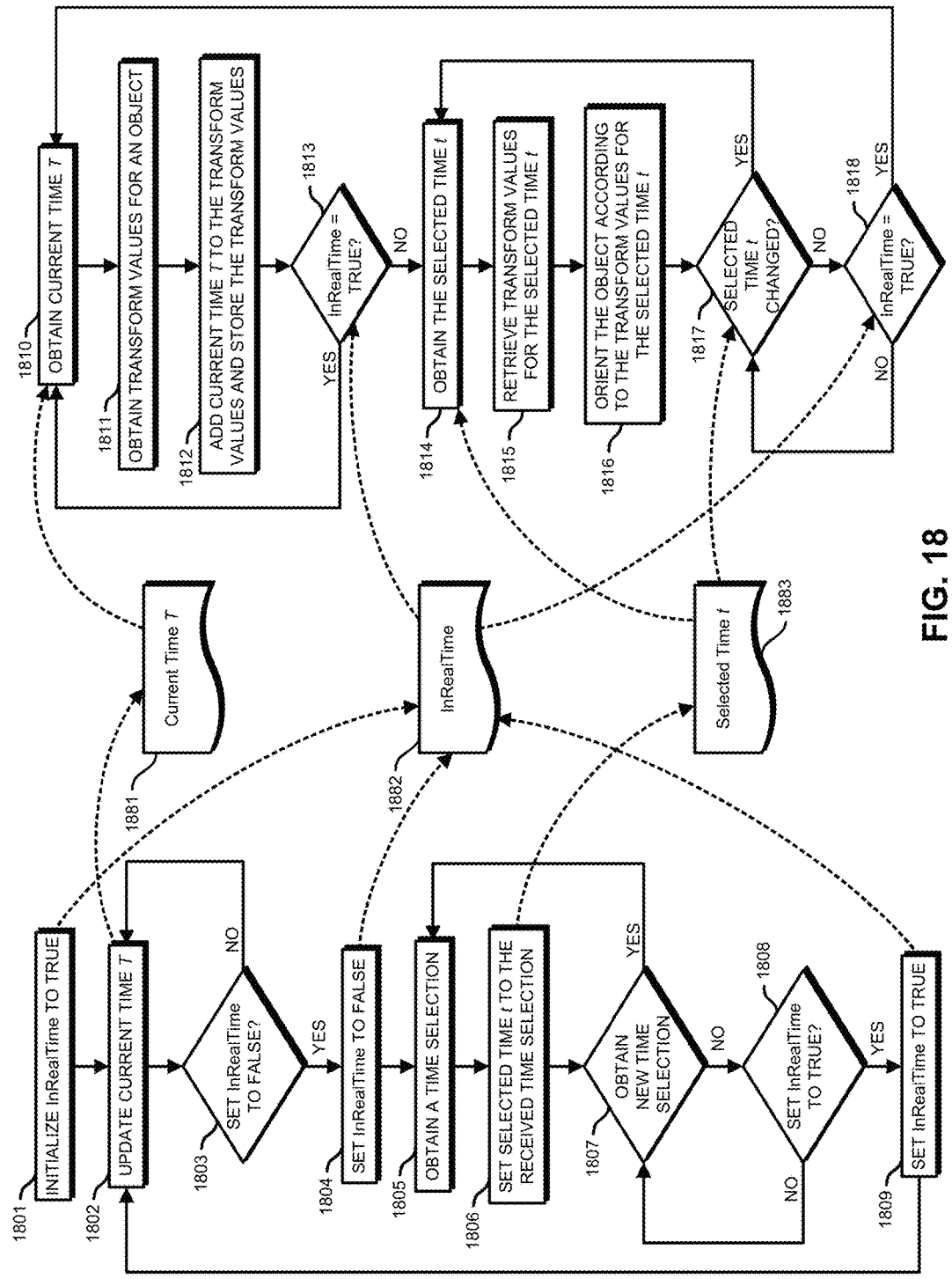
FIG. 18 illustrates example embodiments of operational flows for examining interactions in an enhanced scene.

FIG. 18 illustrates example embodiments of operational flows for examining interactions in an enhanced scene. A first operational flow may be performed by a time warp manager, and a second operational flow may be performed by an object manager.

The first operational flow starts in block 1801, where InRealTime 1882 is initialized to TRUE. Next, in block 1802, current time T 1881 is updated to the current time (e.g., the current time of a system clock). The first flow then moves to block 1803, where it is determined (e.g., by the time warp manager) if InRealTime 1882 is to be set to FALSE, for example in response to receipt of a command to enter playback mode. If not (block 1803=no), then the first flow returns to block 1802. If yes (block 1803=yes), then the first flow moves to block 1804.

In block 1804, InRealTime 1882 is set to FALSE. The first flow then proceeds to block 1805, where a time selection is obtained (e.g., from a control stick or a directional pad). The first flow then moves to block 1806, where the selected time t 1883 is set to the obtained time selection. Next, in block 1807, it is determined if a new time selection is to be obtained. If yes (block 1807=yes), then the first flow returns to block 1805. If not (block 1807=no), then the first flow proceeds to block 1808.

In block 1808, it is determined if InRealTime 1882 is to be set to TRUE. If not (block 1808=no), then the first flow returns to block 1807. If yes (block 1808=yes), then the first flow moves to block 1809, where InRealTime 1882 is set to TRUE, and then the first flow returns to block 1802.

The second operational flow starts in block 1810, where the current time T 1881 is obtained. The second flow then moves to block 1811, where transform values are obtained for an object, for example an object that is associated with an object manager that performs the second operational flow. Next, in block 1812, the current time T 1881 is added to the obtained transform values, and then the transform values are stored on one or more computer-readable media. The second flow then moves to block 1813, where it is determined if InRealTime 1882 is set to TRUE. If yes (block 1813=yes), then the second flow returns to block 1810. If not (block 1813=no), then the second flow proceeds to block 1814.

In block 1814, the selected time t 1883 is obtained. Next, in block 1815, the transform values for the selected time t 1883 are retrieved. The second flow then moves to block 1816, where the object is oriented according to the transform values for the selected time t 1883. For example, the current transform values of the object may be set to the transform values for the selected time t 1883.

Next, in block 1817, it is determined if the selected time t 1883 has changed. If yes (block 1817=yes), then the second flow returns to block 1814. If not (block 1817=no), then the second flow moves to block 1818. In block 1818, it is determined if InRealTime 1882 is TRUE. If not (block 1818=no), then the second flow returns to block 1817. If yes (block 1818=yes), then the second flow returns to block 1810.

The above-described devices and systems can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising:
    obtaining a sequence of images of a physical scene that includes a physical representation of a first virtual object, wherein a shape of the physical representation is different than a shape of the first virtual object;
    calculating a sequence of first transform values of the physical representation of the first virtual object based on the sequence of images, wherein transform values in the sequence of first transform values indicate a position and an orientation of the physical representation of the first virtual object in the physical scene;
    storing the sequence of first transform values of the physical representation of the first virtual object on one or more computer-readable media;
    generating an enhanced scene, wherein the enhanced scene includes the first virtual object and includes a second virtual object at a second position and a second orientation;
    maintaining the first virtual object in the enhanced scene at positions and orientations that are indicated by the transform values in the sequence of first transform values;
    generating images of the enhanced scene from original observer viewpoints, wherein each of the images of the enhanced scene is generated from a respective original observer viewpoint of the original observer viewpoints, wherein each original observer viewpoint has a respective position and a respective orientation, and wherein the original observer viewpoints are determined based on a position and an orientation of a display device;
    receiving an indication of a selected transform value in the sequence of first transform values of the physical representation of the first virtual object;
    retrieving the selected transform value from the sequence of first transform values;
    generating a first replay image of the enhanced scene that shows the first virtual object at the position and the orientation that are indicated by the selected transform value from a first replay observer viewpoint, wherein the first replay observer viewpoint has a position that is different than the respective positions of each of the original observer viewpoints, and wherein the first replay observer viewpoint is determined based on the position and the orientation of the display device;
    receiving a new transform value for the first virtual object that is different from the selected transform value;
    changing the transform value of the first virtual object to the new transform value;
    generating a second replay image of the enhanced scene that shows the first virtual object at the position and the orientation that are indicated by the new transform value from a second replay observer viewpoint, wherein the second replay observer viewpoint has a position that is different than the respective positions of each of the original observer viewpoints and the first replay observer viewpoint, and wherein the second replay observer viewpoint is determined based on the position and the orientation of the display device;
    detecting an interaction between the first virtual object and the second virtual object in the enhanced scene, wherein the interaction is a predetermined proximity, which is greater than zero, of the first virtual object and the second virtual object; and
    in response to detecting the interaction, adding an indicator of the interaction to the second replay image of the enhanced scene.

2. The method of claim 1, wherein the position of the second replay observer viewpoint is closer to the first virtual object than the respective positions of each of the original observer viewpoints and the first replay observer viewpoint.

3. The method of claim 1, wherein the method further comprises:
    changing an appearance of the first virtual object in the enhanced scene in response to detecting the interaction.

4. The method of claim 1, wherein generating the first replay image of the enhanced scene further includes adding a visual cue that indicates a shortest distance between the first virtual object and the second virtual object to the first replay image.

5. The method of claim 1, wherein each transform value in the first sequence of transform values includes a respective x coordinate, y coordinate, z coordinate, x-axis rotation, y-axis rotation, and z-axis rotation.

6. The method of claim 5, where each transform value in the first sequence of transform values further includes a sequence-order number and a time that the x coordinate, y coordinate, z coordinate, x-axis rotation, y-axis rotation, and z-axis rotation were acquired.

7. The method of claim 1, wherein the sequence of images of the physical scene further include a physical representation of the second virtual object, and wherein the method further comprises:

calculating a sequence of second transform values of the physical representation of the second virtual object based on the sequence of images, wherein transform values in the sequence of second transform values indicate a position and an orientation of the physical representation of the second virtual object in the physical scene; and storing the sequence of second transform values of the physical representation of the second virtual object on the one or more computer-readable media, wherein the transform values in the sequence of second transform values are stored at a different rate than the transform values in the sequence of first transform values.

8. The method of claim 7, wherein the sequence of first transform values are stored in association with the first virtual object and wherein the sequence of second transform values are stored in association with the second virtual object.

9. A system comprising:

one or more computer-readable media; and one or more processors that are coupled to the computer-readable media and that are configured to cause the system to obtain a sequence of images of a physical scene that includes a physical representation of a first virtual object, wherein a shape of the physical representation is different than a shape of the first virtual object;

calculate a sequence of first transform values, which are transform values of the physical representation of the first virtual object, wherein transform values in the sequence of first transform values indicate positions and orientations of the physical representation of the first virtual object in the physical scene at respective times;

store the sequence of first transform values of the physical representation of the first virtual object on the one or more computer-readable media;

generate an enhanced scene, wherein the enhanced scene includes the first virtual object and includes a second virtual object at a second position and a second orientation;

maintain the first virtual object in the enhanced scene at positions and orientations that are indicated by the transform values in the sequence of first transform values;

generate an image of the enhanced scene from a first observer viewpoint, wherein the first observer viewpoint is determined based on a position and an orientation of a display device;

receive a collision-detection request;

in response to receiving the collision-detection request, retrieve the sequence of first transform values from the one or more computer-readable media;

detect, by iterating through the sequence of first transform values and comparing the position and the orientation of the first virtual object to the second position and the second orientation of the second virtual object for each of the first transform values, a transform value in the sequence of first transform values that includes a position and an orientation of the first virtual object where the first virtual object shares a three-dimensional region of the enhanced scene with the second virtual object; and in response to detecting transform value, generate a first replay image of the enhanced scene that shows the first virtual object at the position and the orientation of the first virtual object where the first virtual object shares the three-dimensional region of the enhanced scene with the second virtual object, wherein the three-dimensional region is highlighted in the first replay image.

10. The system of claim 9, wherein the one or more processors are further configured to cause the system to generate the first replay image of the enhanced scene from a second observer viewpoint that is different from the first observer viewpoint, wherein the second observer viewpoint is determined based on the position and the orientation of the display device.

11. The system of claim 9, wherein the one or more processors are further configured to cause the system to implement a time warp manager and an object manager, wherein the time warp manager updates a current time of the system, and wherein the object manager controls the storing of the sequence of first transform values of the physical representation of the first virtual object on the one or more computer-readable media.

12. The system of claim 9, wherein the one or more processors are further configured to cause the system to display the first virtual object in the first replay image in a color that is different than a color of the first virtual object in the image of the enhanced scene.

13. One or more computer-readable storage media that store instructions that, when executed by one or more computing devices, cause the one or more computing devices to perform operations comprising:

obtaining a sequence of images of a physical scene that includes a physical representation of a first virtual object in the physical scene, wherein a shape of the physical representation is different than a shape of the first virtual object;

calculating a sequence of first transform values of the physical representation of the first virtual object based on the sequence of images, wherein transform values in the sequence of first transform values indicate respective positions and orientations of the physical representation of the first virtual object;

storing the sequence of first transform values of the physical representation of the first virtual object on one or more computer-readable media;

generating an enhanced scene, wherein the enhanced scene includes the first virtual object;

maintaining the first virtual object in the enhanced scene at positions and orientations that are indicated by the transform values in the sequence of first transform values;

generating an image of the enhanced scene from an original observer viewpoint that has a position and an orientation;

receiving an indication of a selected transform value in the sequence of first transform values of the physical representation of the first virtual object;

retrieving the selected transform value from the one or more computer-readable media;

generating a first replay image of the enhanced scene that shows the first virtual object at the position and the orientation that are indicated by the selected transform value from a first replay observer viewpoint, wherein the first replay observer viewpoint has a position that is different than the position of the original observer viewpoint;

receiving a new transform value for the first virtual object that is different from the selected transform value;

changing the transform value of the first virtual object to the new transform value;

generating a second replay image of the enhanced scene that shows the first virtual object at a position and an orientation that are indicated by the new transform value from the first replay observer viewpoint;

detecting an interaction between the first virtual object and a second virtual object in the enhanced scene; and in response to detecting the interaction, adding an indicator of the interaction to the second replay image of the enhanced scene, wherein the interaction is a predetermined proximity, which is greater than zero, of the first virtual object and the second virtual object, wherein the original observer viewpoint and the first replay observer viewpoint are determined based on a position and an orientation of a display device.

14. The one or more computer-readable storage media of claim 13, wherein the operations further comprise generating a third replay image of the enhanced scene that shows the first object at the position and the orientation that are indicated by the new transform value from a second replay observer viewpoint, wherein the second replay observer viewpoint has a position that is different than the position of the original observer viewpoint and the first replay observer viewpoint, and wherein the second replay observer viewpoint is determined based on the position and the orientation of the display device.

15. The one or more computer-readable storage media of claim 13, wherein the sequence of images of the physical scene further includes a physical representation of the second virtual object, and wherein the operations further comprise calculating a sequence of second transform values of the physical representation of the second virtual object; and storing the sequence of second transform values of the physical representation of the second virtual object on the one or more computer-readable media.

16. The one or more computer-readable storage media of claim 15, wherein the transform values in the sequence of second transform values are stored at a different rate than the transform values in the sequence of first transform values.

* * * * *